US010284784B2

(12) United States Patent
Karibe et al.

(10) Patent No.: US 10,284,784 B2
(45) Date of Patent: May 7, 2019

(54) SHUTTER APPARATUS, IMAGING APPARATUS, CONTROL METHOD FOR SHUTTER APPARATUS, STORAGE MEDIUM STORING CONTROL PROGRAM

(71) Applicant: CANON KABUSHIKI KAISHA, Tokyo (JP)

(72) Inventors: Kazuya Karibe, Kawasaki (JP); Masahiro Takayama, Hirosaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/673,485

(22) Filed: Aug. 10, 2017

(65) Prior Publication Data

US 2018/0054560 A1 Feb. 22, 2018

(30) Foreign Application Priority Data

Aug. 16, 2016 (JP) .................... 2016-159529

(51) Int. Cl.
*H04N 5/372* (2011.01)
*H04N 5/235* (2006.01)
*H04N 5/225* (2006.01)
*G03B 9/40* (2006.01)

(52) U.S. Cl.
CPC ............ *H04N 5/2353* (2013.01); *G03B 9/40* (2013.01); *H04N 5/2254* (2013.01); *H04N 5/372* (2013.01)

(58) Field of Classification Search
CPC .... H04N 5/2353; H04N 5/372; H04N 5/2254; G03B 9/08
See application file for complete search history.

(56) References Cited

U.S. PATENT DOCUMENTS

| 8,212,918 B2* | 7/2012 | Tanaka | G03B 7/093 348/296 |
| 2002/0006285 A1* | 1/2002 | Takahashi | H04N 5/2254 396/484 |
| 2011/0176799 A1* | 7/2011 | Shintani | G03B 9/14 396/484 |
| 2014/0016023 A1* | 1/2014 | Min | H04N 5/2353 348/362 |
| 2014/0160312 A1* | 6/2014 | Shintani | G03B 9/36 348/220.1 |
| 2017/0351162 A1* | 12/2017 | Hasuda | G03B 9/36 |

FOREIGN PATENT DOCUMENTS

JP H07-56211 A 3/1995

* cited by examiner

*Primary Examiner* — Nhan T Tran
(74) *Attorney, Agent, or Firm* — Venable LLP

(57) ABSTRACT

A shutter apparatus of an electronic front curtain system includes a motor configured to rotate in a first rotating direction and a second rotating direction opposite to the first rotating direction, a first light shield movable between a close state for closing an aperture and an open state for opening the aperture, a second light shield movable between the close state for closing the aperture and the open state for opening the aperture, and a first cam member configured to interlock and move the first light shield and the second light shield in accordance with a rotation in each of the first rotating direction and the second rotating direction of the motor.

10 Claims, 28 Drawing Sheets

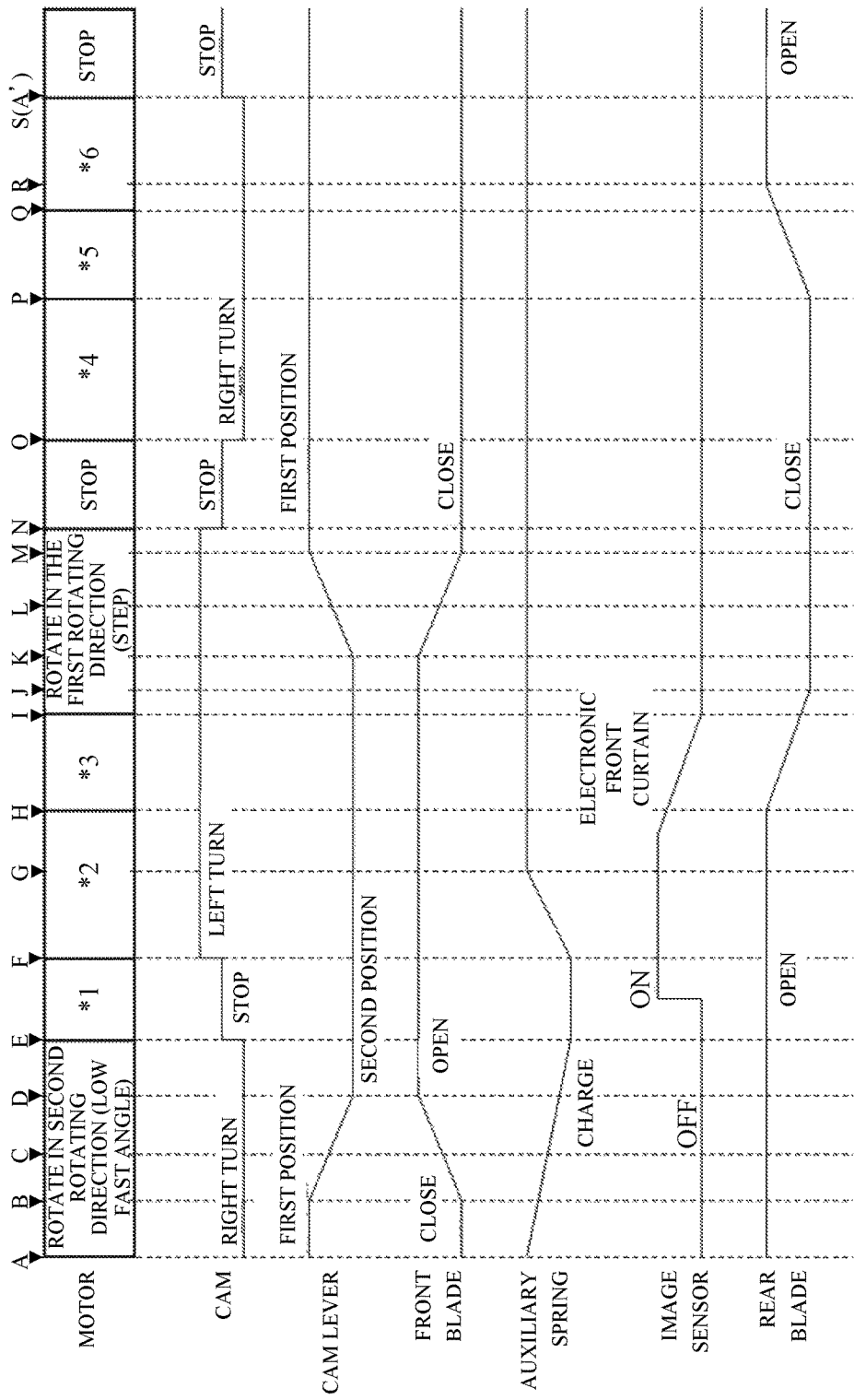

SHUTTER APPARATUS, IMAGING APPARATUS, CONTROL METHOD FOR SHUTTER APPARATUS, STORAGE MEDIUM STORING CONTROL PROGRAM

BACKGROUND OF THE INVENTION

Field of the Invention

The present invention relates to a shutter apparatus of an electronic front curtain system.

Description of the Related Art

Japanese Patent Laid-Open No. ("JP") 7-56211 discloses a shutter apparatus that includes two pairs of light shields and two pairs of stepping motors connected to the light shields and configured to open and close an aperture in a lens through the light shields. This configuration can drive each of front and rear curtains in the shutter by driving each stepping motor.

One conventionally proposed imaging apparatus includes a focal plane shutter for a camera and an electronic shutter and uses them for an imaging action. This imaging apparatus captures an image through rear blades including a mechanical shutter and the electronic shutter configured to provide reset scanning of pixels on the image sensor before the rear curtain runs. The blades include a plurality of arms, a shutter blade, and a pivot member, and reciprocate between a position at which the blades cover the aperture in a shutter base plate and a retreat position. The charge accumulation start scanning (reset scanning) on the image sensor has a scanning pattern suitable for a scanning characteristic of the mechanical shutter in the rear curtain.

The thus configured shutter needs to shield light through the rear blades so as to prevent the image sensor from being exposed in reading the electric charges after the image is captured from the image sensor. For the next imaging, an exposure action is performed after the shutter base plate in the mechanical shutter is moved from the light shielding state to the opening state. The shutter having the front blades can restore to a pre-capturing standby state without exposing the image sensor, by charging the front blades and the rear blades in this order in reading the electric charges from the image sensor after the image is captured. Hence, in comparison with the shutter apparatus that includes the front blades and the rear blades, a release time lag in consecutive shooting and a low frame rate are problematic. For a higher frame rate, the front blades may be provided so as to shield light from the image sensor, the front and rear blades may be charged in reading the electric charges, and the state may be restored to the pre-captured standby state.

However, when the focal plane shutter and the electronic shutter are used for the imaging action by providing the light-shielding front blades, the shutter apparatus in JP 7-56211 needs an actuator for controlling the front blades. Hence, the shutter apparatus becomes large and the manufacturing cost increases.

SUMMARY OF THE INVENTION

The present invention provides a shutter apparatus of an electronic front curtain system, an imaging apparatus, a control method for a shutter apparatus, and a storage medium for storing a control program, each of which is small and economic.

A shutter apparatus of an electronic front curtain system according to one aspect of the present invention includes a motor configured to rotate in a first rotating direction and a second rotating direction opposite to the first rotating direction, a first light shield movable between a close state for closing an aperture and an open state for opening the aperture, a second light shield movable between the close state for closing the aperture and the open state for opening the aperture, and a first cam member configured to interlock and move the first light shield and the second light shield in accordance with a rotation in each of the first rotating direction and the second rotating direction of the motor.

Further features of the present invention will become apparent from the following description of exemplary embodiments with reference to the attached drawings.

BRIEF DESCRIPTION OF THE DRAWINGS

FIG. 7 is a timing chart illustrating an operation of each component in the focal plane shutter according to this embodiment.

DESCRIPTION OF THE EMBODIMENTS

Referring now to the accompanying drawings, a detailed description will be given of embodiments of the present invention.

Figure 17:
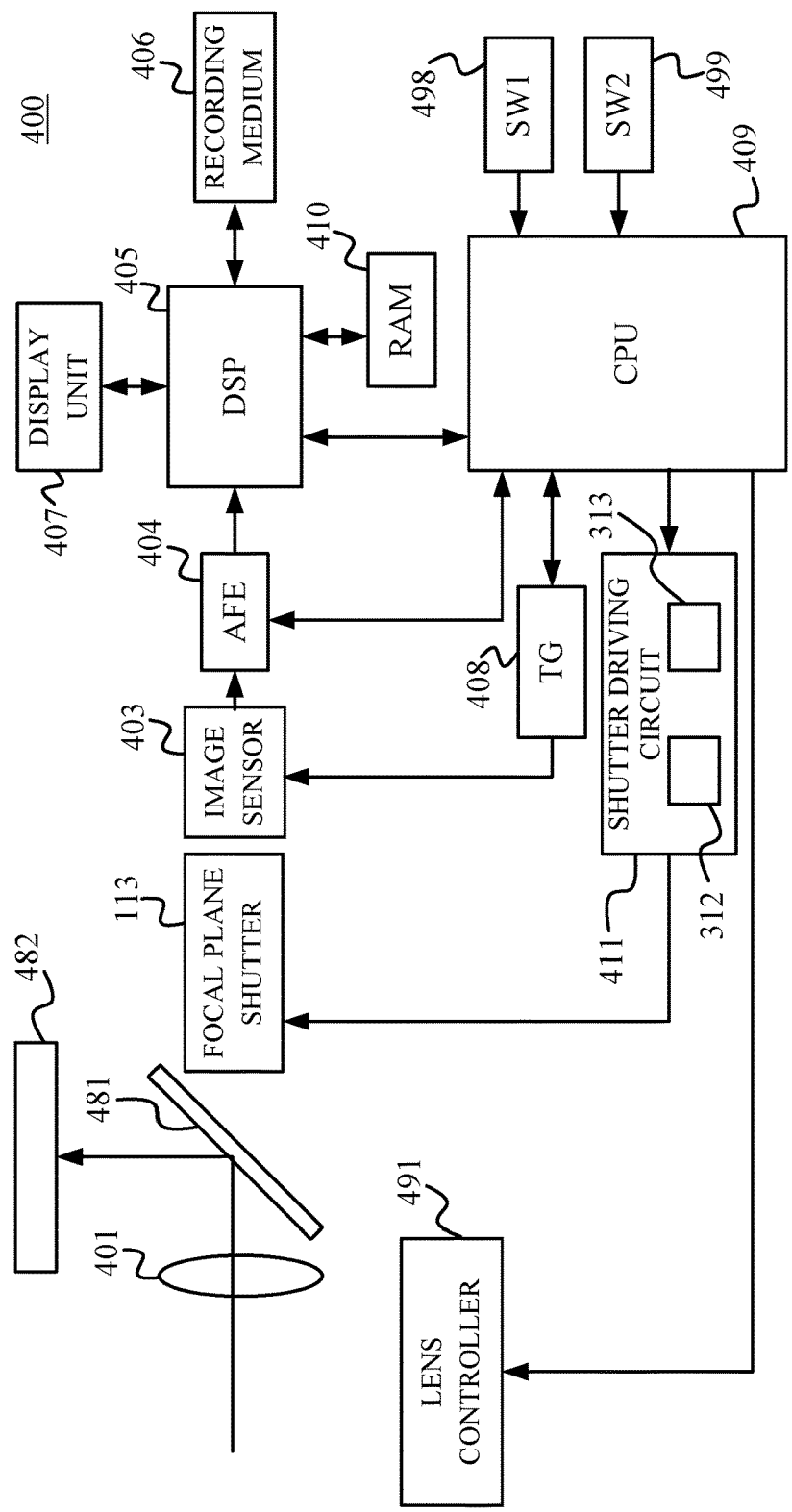
FIG. 17 is a block diagram of an imaging apparatus according to this embodiment.

Referring now to FIGS. 17 to 21, a description will be given of an imaging apparatus according to this embodiment. FIG. 17 is a block diagram of an imaging apparatus 400. In the imaging apparatus 400, reference numeral 401 denotes an imaging lens or optical system, reference numeral 113 denotes a focal plane shutter, reference numeral 403 denotes an image sensor, reference numeral 481 denotes a mirror unit, and reference numeral 482 denotes a viewfinder unit.

As illustrated in FIG. 17, in a viewfinder observation state of the imaging apparatus 400, part of light among object light that passes the imaging lens 401 is reflected on the mirror unit 481 disposed in the imaging optical path, and introduced to the viewfinder unit 482. Thereby, a photographer can observe the object image via the viewfinder unit 482. On the other hand, when the viewfinder observation state transfers to the imaging state or the live-view state, the mirror unit 481 retreats from the imaging optical path by an unillustrated mirror-unit driving unit. Thereby, the object light from the imaging lens 401 travels to the image sensor 403. The focal plane shutter 113 is disposed on the object side of the image sensor 403.

A shutter driving circuit 411 controls driving of the focal plane shutter 113. The focal plane shutter 113 includes a mechanical rear curtain that includes a plurality of blades 13, 14, 15, and 16, as described later. A CPU 409 controls driving of the focal plane shutter 113 via the shutter driving circuit 411. The focal plane shutter 113 includes a motor 27, which will be described later. A drive circuit 313 and a control circuit 312 (motor driver) included in the shutter driving circuit 411, which will be described later, controls the motor 27. Reference numeral 498 denotes an imaging preparation start switch SW1, and reference numeral 499 denotes an imaging start switch SW2. The switch (SW1) 498 and the switch (SW2) 499 constitute a two-stage switch. A first stroke turns on the switch (SW1) 498, and a second stroke turns on the switch (SW2) 499.

The image sensor 403 includes a CMOS image sensor, etc., photoelectrically converts an object image (optical image) formed by the imaging lens 401, and outputs image data. An AFE (analog front end) 404 includes an A/D converter, and converts the image data output (analog image signal) from the image sensor 403 into a digital image signal. A DSP (digital signal processor) 405 performs a variety of image processes, a compression and extension process, etc. for the digital image signal output from the AFE 404.

A recording medium 406 includes a nonvolatile memory (EEPROM) for storing image data processed by the DSP 405. A display unit 407 includes a liquid crystal display (LCD) etc., and displays a captured image and a variety of menu screens. A TG 408 represents a timing generator and controls driving of the image sensor 403 based on a command of the CPU 409. A RAM 410 is connected to the DSP 405, and temporarily stores image data etc.

A lens controller 491 outputs lens information, such as a focal length, an F-number, and an exit pupil diameter, and a distance between an exit pupil in the imaging lens 401 and the image sensor 403, to the CPU 409. The lens controller 491 controls driving of the diaphragm (aperture stop), the lens, etc. based on the command from the CPU 409. A detection result by each detector of the imaging apparatus 400 is input to the CPU 409. The CPU 409 controls each component, such the AFE 404, the DSP 405, the TG 408, the shutter driving circuit 411, and the lens controller 491.

Figure 18:
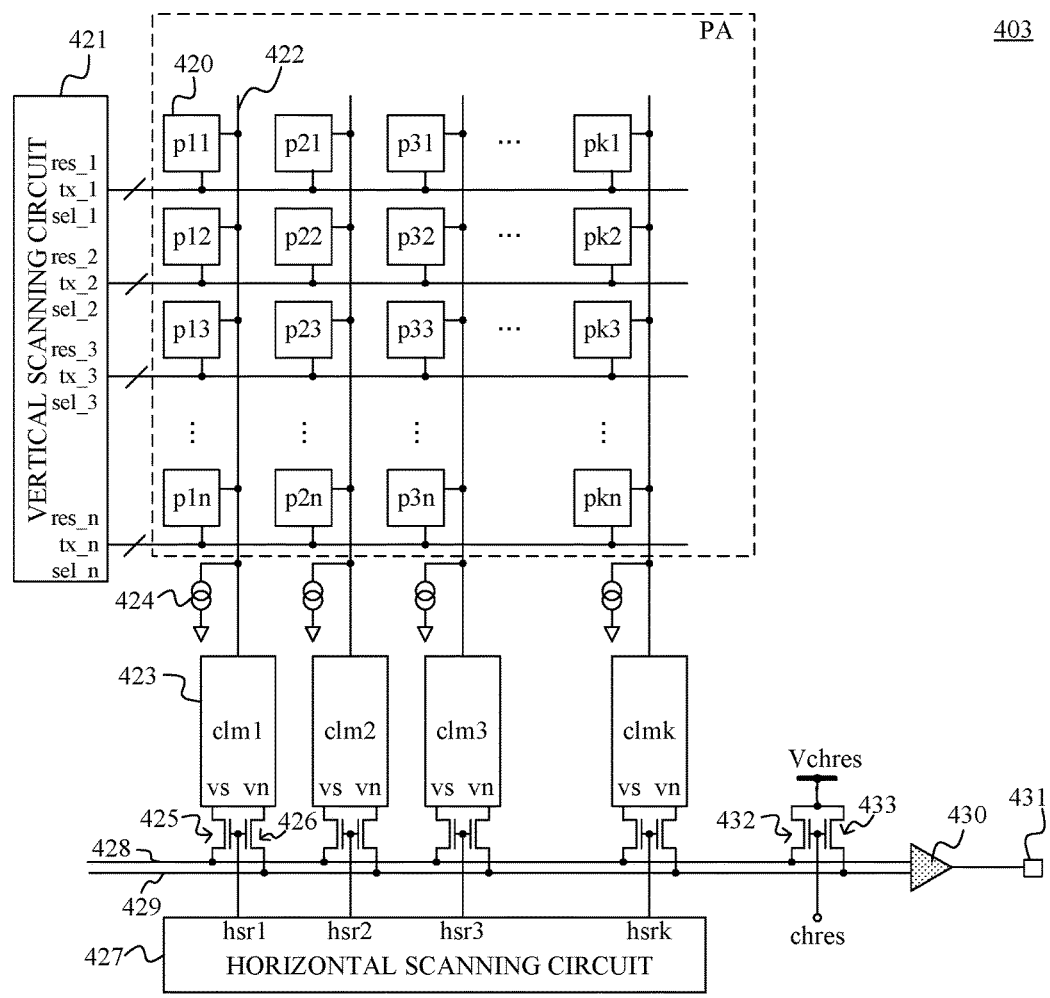
FIG. 18 is an overall configuration view of an image sensor according to this embodiment.
Figure 19:
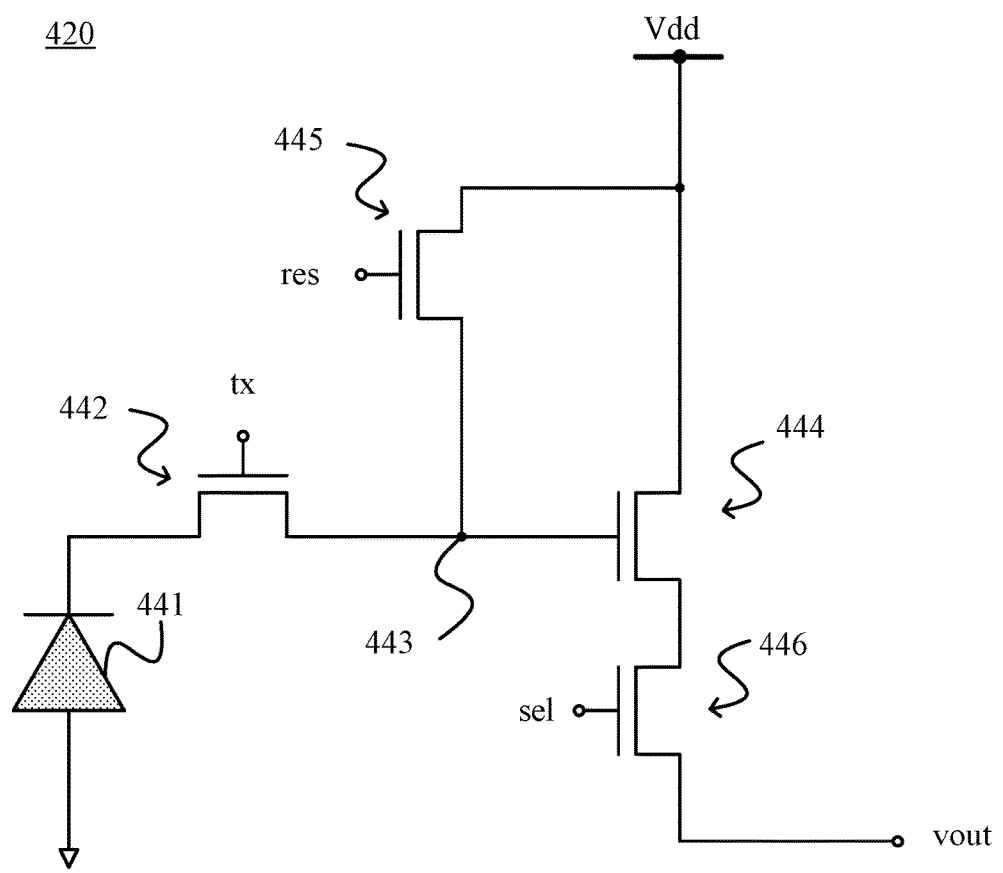
FIG. 19 is a circuit diagram of one pixel unit on the image sensor according to this embodiment.

Referring now to FIGS. 18 and 19, a description will be given of an imaging action by the image sensor 403. FIG. 18 is an overall configuration diagram of the image sensor 403. FIG. 19 is a circuit diagram of one pixel unit 420 in the image sensor 403.

As illustrated in FIG. 18, a plurality of pixel units 420 (pixels p11 to pkn) are disposed in a matrix shape in a pixel area PA on the image sensor 403. In FIG. 19, a photodiode (PD) 441 photoelectrically converts an incident light signal and accumulates electric charges corresponding to an exposure amount. The electric charges accumulated in the PD 441 are transferred to an FD (floating diffusion) unit 443 by turning a signal tx to a transfer gate 442 into a high level. The FD unit 443 is connected to a gate of a floating diffusion amplifier (FD amplifier) 444. The FD amplifier 444 converts a charge amount transferred from the PD 441 into a voltage amount.

As a signal res to an FD reset switch 445 is turned into a high level, the electric charges in the FD unit 443 are reset. When the electric charges in the PD 441 are reset, the signals tx and res are simultaneously turned into the high levels, both of the transfer gate 442 and the FD reset switch 445 are turned on, and the PD 441 is reset via the FD unit 443. When a signal sel to the pixel selecting switch 446 is turned into a high level, a pixel signal converted by the FD amplifier 444 into the FD amplifier 444 is output to an output unit vout of the pixel unit 420.

In FIG. 18, a vertical scanning circuit 421 supplies driving signals res_1, tx_1, and sel_1, etc. to each pixel. These driving signals are connected to res, tx, and sel in each pixel. The output unit vout of each pixel is connected to common column read circuits 423 (clm1 to clmk) via vertical output lines 422 for each column.

Figure 20:
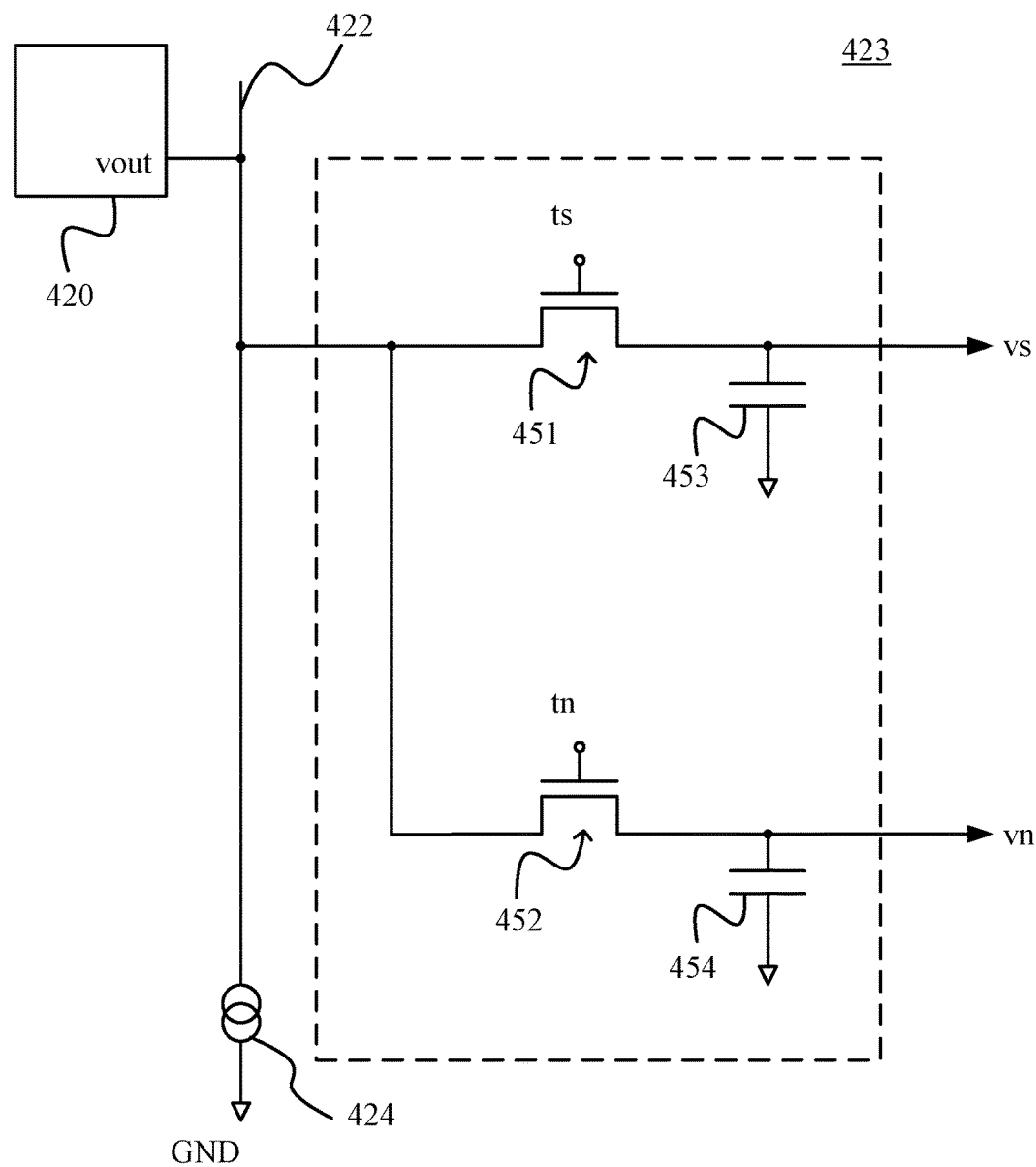
FIG. 20 is a circuit diagram of a common column read circuit in the image sensor according to this embodiment.

Referring now to FIG. 20, a description will be given of the common column read circuit 423. FIG. 20 is a circuit diagram of the common column read circuit 423 in the image sensor 403. The vertical output line 422 is provided for each column, and the output unit vout of the pixel unit 420 for one column is connected to each vertical output line 422. The vertical output line 422 is connected to a current source 424, and the current source 424 and the FD amplifier 444 in each pixel in the pixel unit 420 constitute a source follower circuit.

A pixel signal S read out of the pixel unit 420 is stored in an S-signal holding capacitor 453 via an S-signal transfer switch 451 by turning the signal is into a high level. A noise signal N read out of the pixel unit 420 is stored in an N-signal holding capacitor 454 via an N-signal transfer switch 452 by turning the signal to into a high level. Each of the S-signal holding capacitor 453 and the N-signal holding capacitor 454 is connected to the output unit vs and vn in the common column read circuit 423.

In FIG. 18, output terminals vs and vn in the common column read circuit 423 are connected to the horizontal transfer switches 425 and 426. The horizontal transfer switches 425 and 426 are controlled by an output signal hsr* from a horizontal scanning circuit 427 (where * represents a column number 1 to k). When the signal hsr* is turned into a high level, the signals from the S-signal holding capacitor 453 and the N-signal holding capacitor 454 are transferred to the horizontal output lines 428 and the 429. Horizontal output lines 428 and 429 are connected to an input terminal in the differential amplifier 430. The differential amplifier 430 calculates a difference between the S signal and the N signal, applies a predetermined gain to the difference, and outputs a final image signal to the output terminal 431. When a signal chres is becomes high, horizontal output lines reset switches 432 and 433 are turned on and the horizontal output lines 428 and 429 are reset to a reset voltage Vchres.

Figure 21:
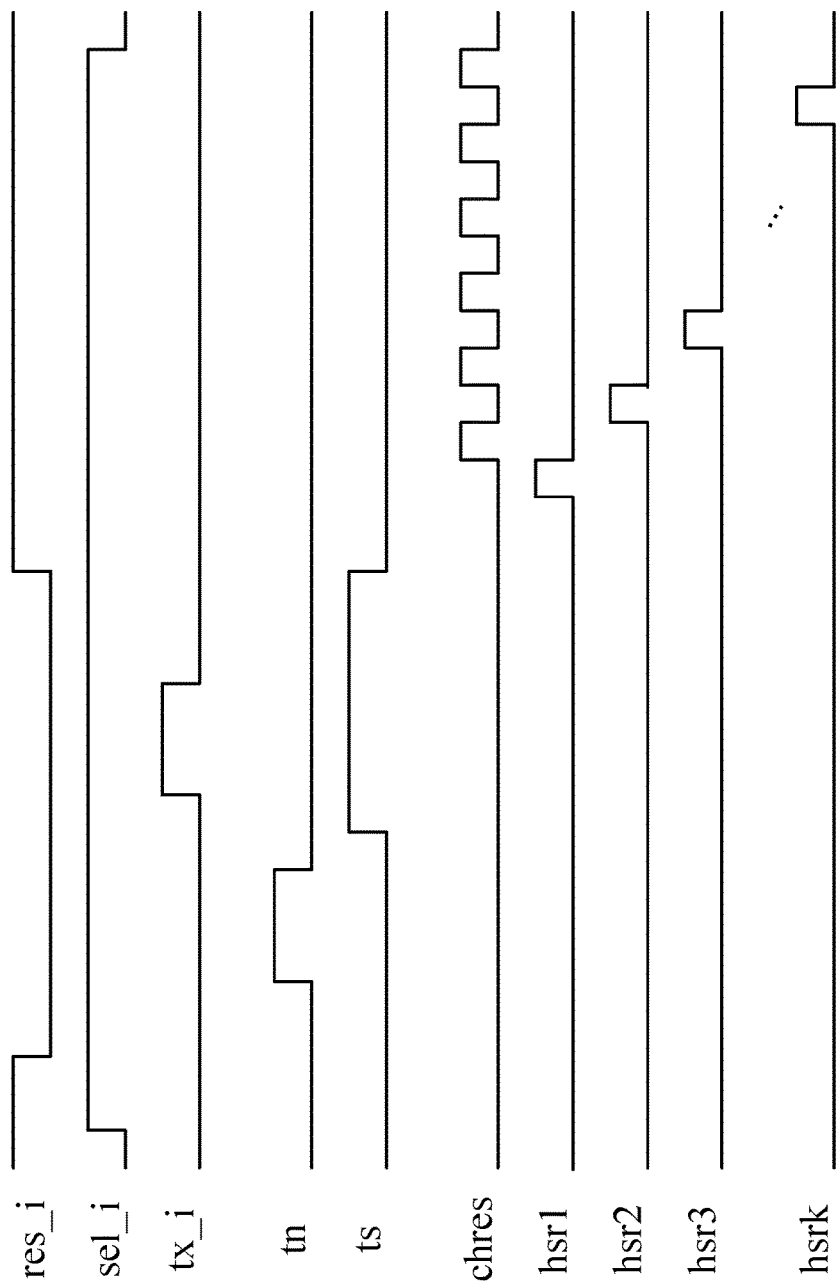
FIG. 21 is a timing chart of reset scanning and still-image read scanning for the image sensor according to this embodiment.

Referring now to FIG. 21, a description will be given of still-image read scanning from the image sensor 403. FIG. 21 is a timing chart illustrating an operation per one row or line in the reset scanning and still-image read scanning of the image sensor 403. Now assume that data of an i-th row or line is read.

Initially, a pixel selecting switch 446 is turned on for the pixels in the i-th row by turning a signal sel_i into a high level. Thereafter, a signal res_i is turned into a low level, the FD reset switch 445 is turned off and the reset of the FD unit 443 is released. Next, the signal tn is turned into a high level, and the N signal is stored in the N-signal holding capacitor 454 via the N signal transfer switch 452. Next, the signal tn is turned into a low level, and the N signal transfer switch 452 is turned off. The signal ts is turned into a high level, the S-signal transfer switch 451 is turned on, the signal tx_i is turned into a high level, and the transfer gate 442 is turned on. This operation outputs the signal accumulated in the PD 441 for the selected i-th row to the vertical output line 422 via the FD amplifier 444 and the pixel selecting switch 446, and the accumulated signal is stored in the S-signal holding capacitor 453 via the S-signal transfer switch 451.

Next, the signals tx_i and ts are turned into the low levels, the transfer gate 442 and the S-signal transfer switch 451 are closed, and the signal res_i is turned into a high level. The FD reset switch 445 is turned on, and the FD unit 443 is reset. Thus, the N signal and S signal for the i-th row are stored in the S-signal holding capacitor 453 and the N-signal holding capacitor 454.

Next, the S signal and the N signal accumulated in the S-signal holding capacitor 453 and the N-signal holding capacitor 454 are output from the image sensor 403. Initially, when an output hsr1 from the horizontal scanning circuit 427 is turned into a high level, the horizontal transfer switches 425 and 426 are turned on, the S-signal holding capacitor 453 and the N-signal holding capacitor 454 are output to the output terminal 431 via the horizontal output lines 428 and 429 and the differential amplifier 430.

The horizontal scanning circuit 427 outputs all data for the i-th row by sequentially turning the selected signals hsr1, hsr2, . . . , and hsrk for each column into a high level. While the signal for each column is read by the signals hsr1 to hsrk, the signal chres is turned into a high level, the horizontal output line reset switches 432 and 433 are turned on, and the horizontal output lines 428 and 429 are once reset to the reset voltage Vchres. Thus, the read operation ends for one line. This operation is repeated for each row, and signals are read out of the image sensor 403 for all rows.

Figure 1A:
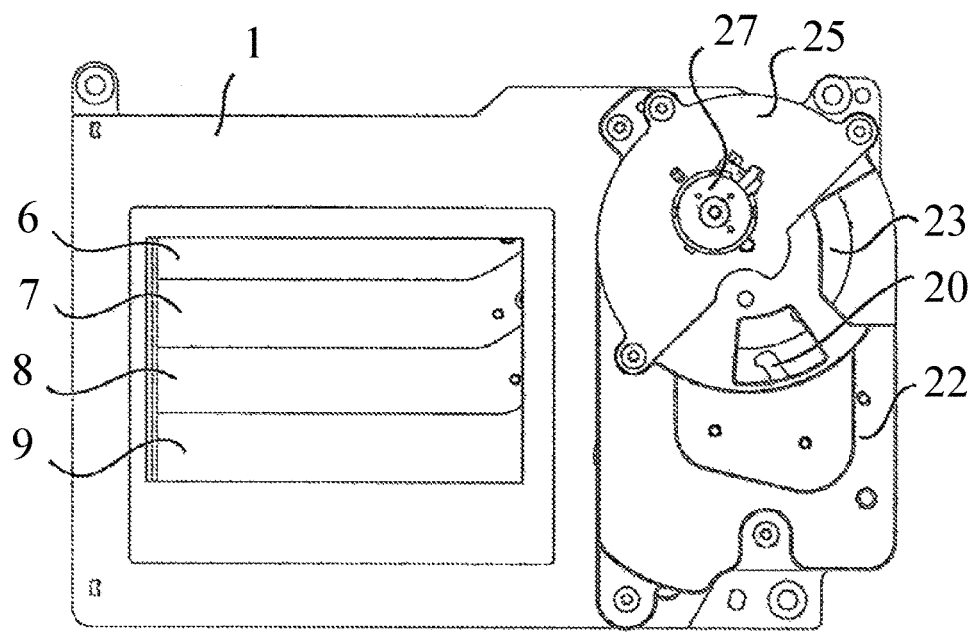
FIGS. 1A and 1B are a front view (viewed from an image sensor side) and a rear view (viewed from an object side) of a focal plane shutter according to this embodiment.
Figure 1B:
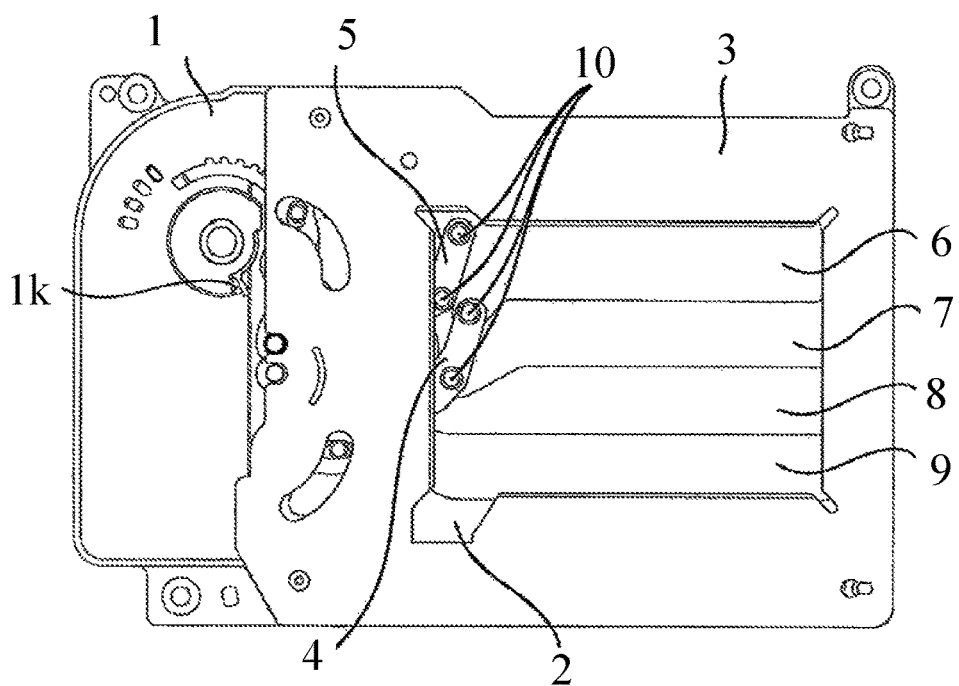
Figure 2A:
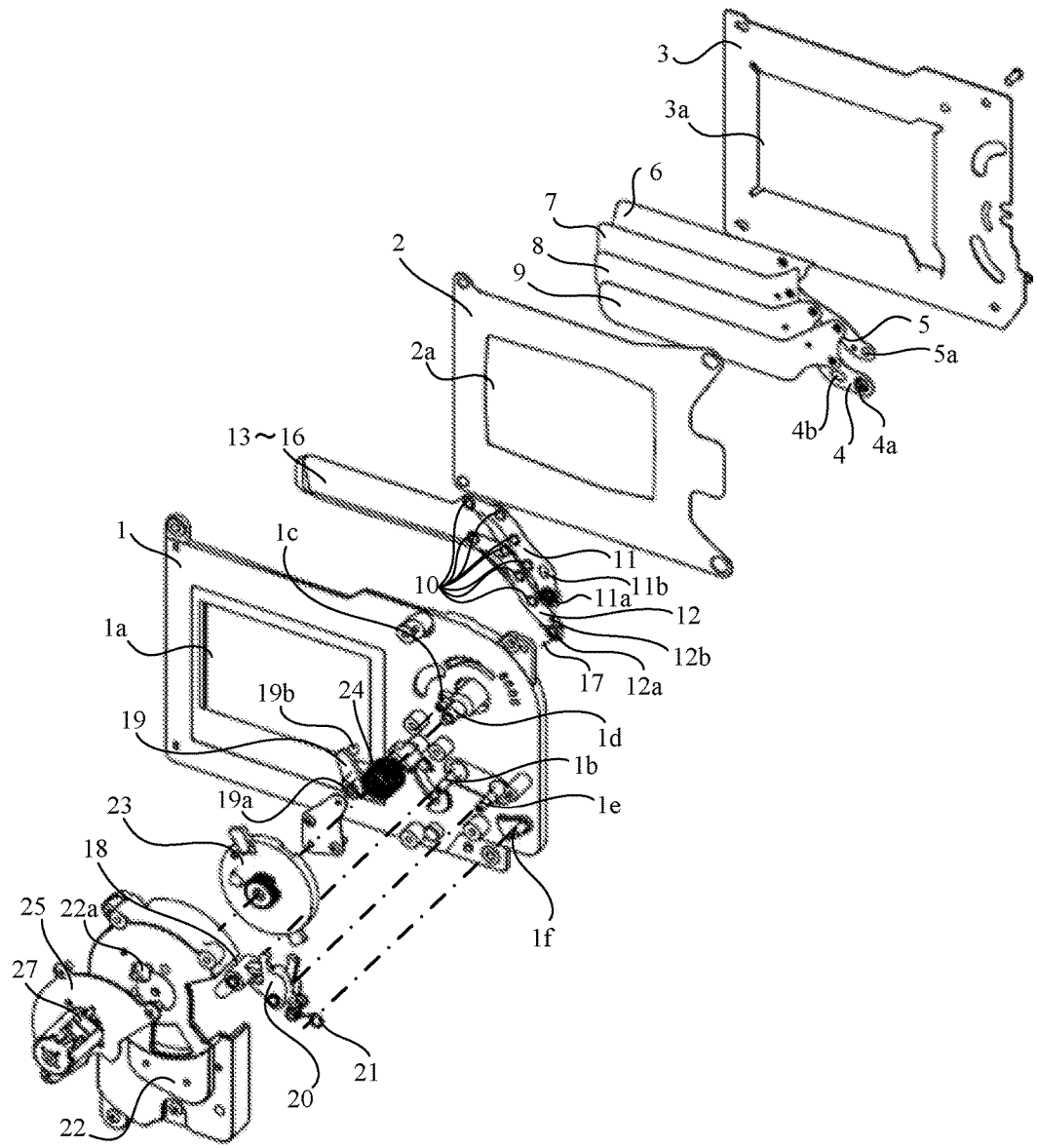
FIG. 2A is an exploded perspective view (viewed from the image sensor side) of the focal plane shutter according to this embodiment.
Figure 2B:
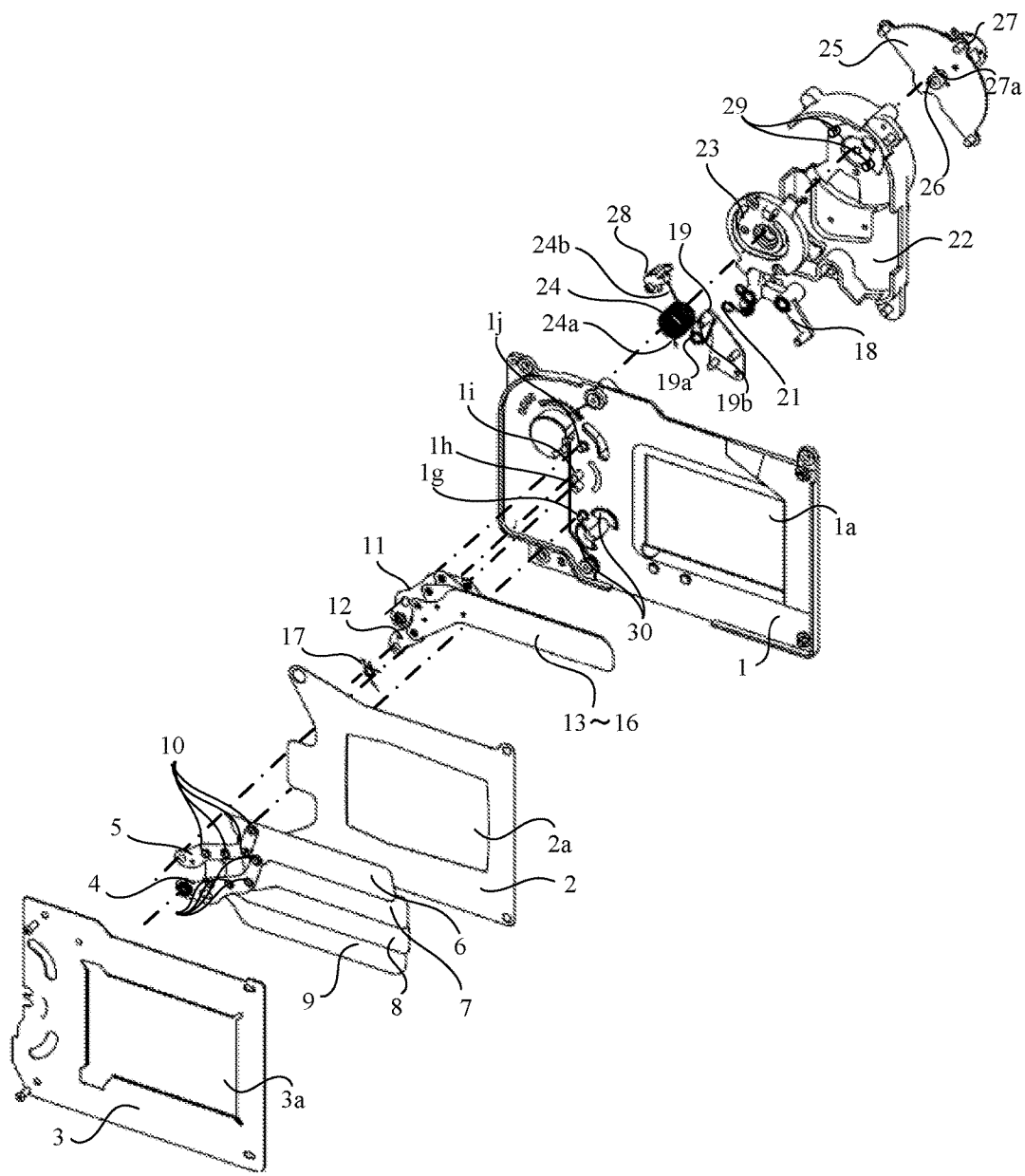
FIG. 2B is an exploded perspective view (viewed from the object side) of the focal plane shutter according to this embodiment.

Referring now to FIGS. 1A to 6, a description will be given of a configuration of the focal plane shutter 113 according to this embodiment. FIG. 1A is a front view of the focal plane shutter 113 (viewed from the image sensor 403 side). FIG. 1B is a rear view of the focal plane shutter 113 (viewed from the object side). FIG. 2A is an exploded perspective view of the focal plane shutter 113 viewed from the image sensor 403 side. FIG. 2B is an exploded perspective view of the focal plane shutter 113 viewed from the object side.

A partition plate 2 and a cover plate 3 are attached to a shutter base plate 1 on the side of the image sensor 403. The shutter base plate 1, the partition plat 2, and the cover plate 3 have apertures 1a, 2a, and 3a (openings) which have similar shapes to one another, and a rectangular exposure opening made by superimposing these three apertures 1a, 2a, and 3a define a light flux that passes the shutter. A front unit (second light shield) is provided between the partition plate 2 and the cover plate 3 and includes blades (front blades) 6, 7, 8, and 9, blade coupling shafts 10, a front-blade main arm 4, and a front blade sub arm 5. A rear blade unit (first light shield) is provided between the shutter base plate 1 and the partition plate 2 and includes blades (rear blades) 13, 14, 15, and 16, the blade coupling shafts 10, the rear-blade main arm 11, and the rear-blade sub arm 12. A plurality of shafts 1b, 1c, 1d, 1e, 1f, 1g, 1h, 1i, and 1j are provided to the shutter base plate 1 on the sides of the object and the image sensor 403. The focal plane shutter 113 includes a cam lever 20 (second cam member).

Figure 3A:
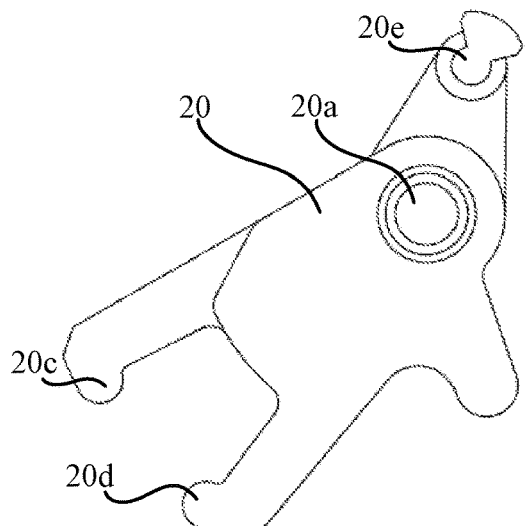
FIGS. 3A to 3C are a front view, a side view, and a rear view of a cam lever in the focal plane shutter according to this embodiment.
Figure 3B:
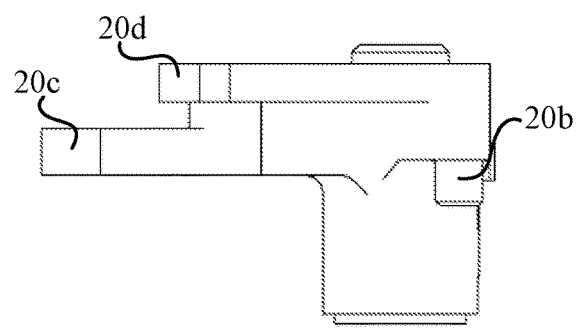
Figure 3C:
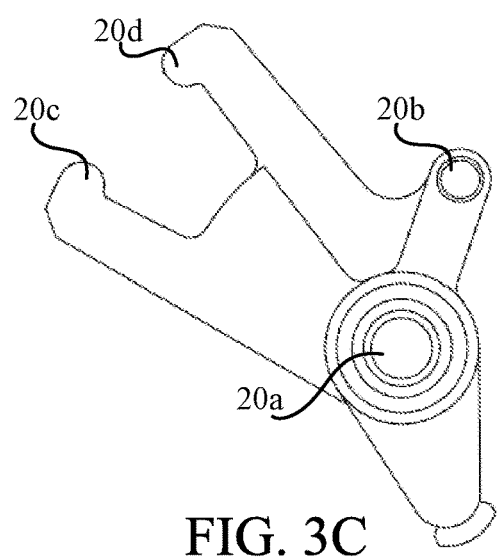

FIGS. 3A to 3C are front, side, and rear views of the cam lever 20, respectively. A hole 20a in the cam lever 20 is rotatably engaged with the shaft 1e on the shutter base plate 1. The cam lever 20 includes a first contact part 20b and a second contact part 20c. A slide pin 20d is engaged with a rail part 18c in the front-blade driving member 18. A shaft 20e is engaged with an arm 21b of a toggle spring 21 on a movable end side, which has an arm 21a on its fixed end side pivotably supported by the shaft 1f of the shutter base plate 1. The focal plane shutter 113 includes the front-blade driving member 18.

Figure 4A:
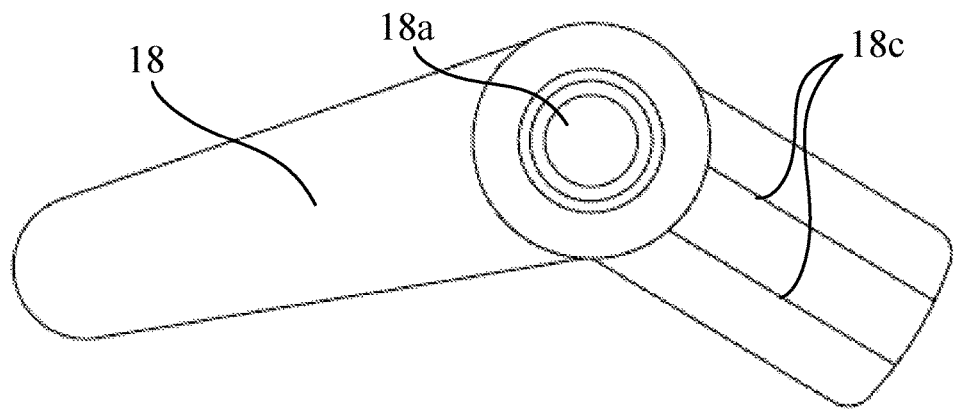
FIGS. 4A and 4B are a front view and a side view of a front-blade driving member in the focal plane shutter according to this embodiment.
Figure 4B:
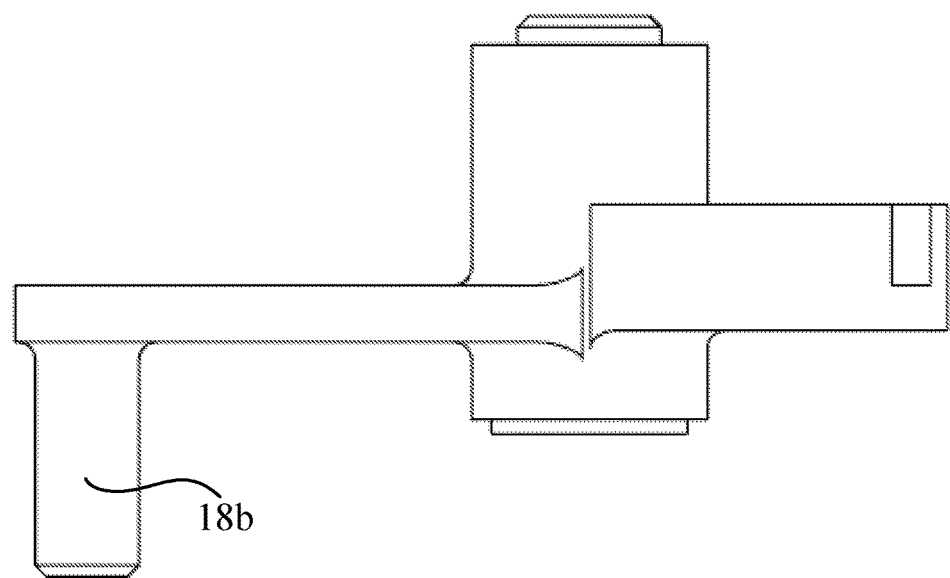

FIGS. 4A and 4B are front and side views of the front-blade driving member 18. The shaft 1b on the shutter base plate 1 is rotatably engaged with a hole 18a in the front-blade driving member 18. A front-blade driving pin 18b is engaged with a hole 4b in the front-blade main arm 4. The rail part 18c in the front-blade driving member 18 is engaged with a slide pin 20d on the cam lever 20, and the front-blade driving member 18 rotates as the cam lever 20 rotates.

Figure 5A:
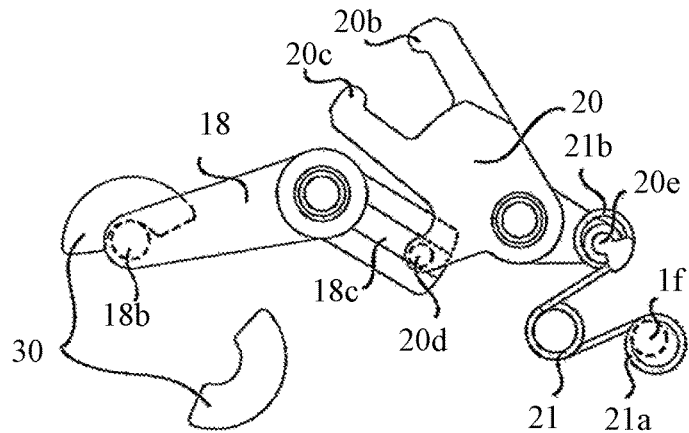
FIGS. 5A to 5C illustrate an operation of principal part in the focal plane shutter according to this embodiment.
Figure 5B:
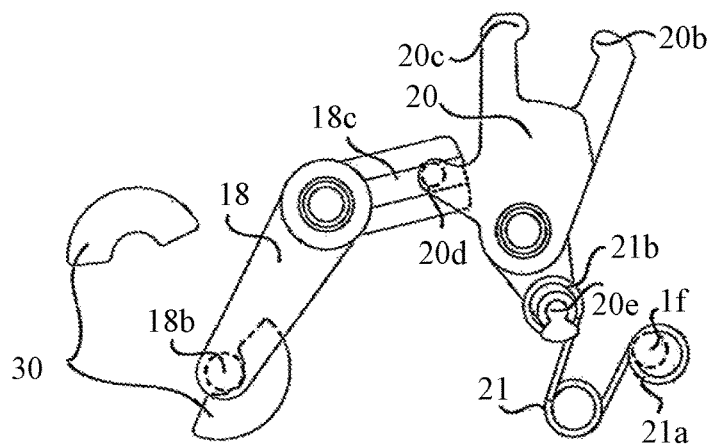
Figure 5C:
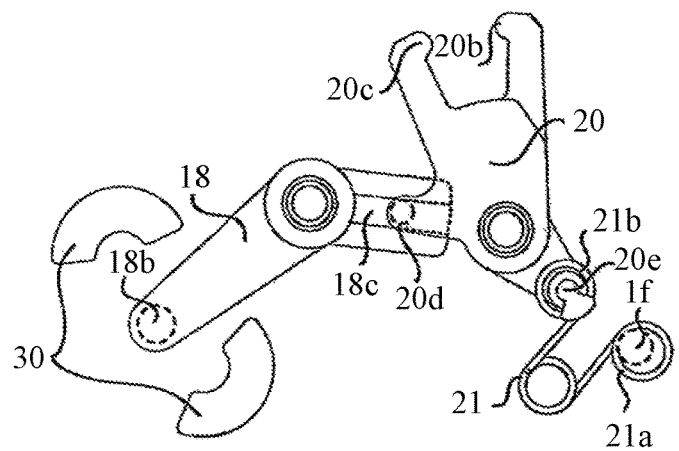

FIGS. 5A to 5C illustrate an operation of a principal part of the focal plane shutter 113 (which includes the front-blade driving member 18, the cam lever 20, and the toggle spring 21). As illustrated in FIGS. 5A and 5B, the front-blade driving member 18 is restricted from rotating when the front-blade driving pin 18b in the front-blade driving member 18 contacts a buffer member 30. Thereby, the cam lever 20 is locked via the slide pin 18b engaged with the rail part 18c in the front-blade driving member 18. Herein, a first position is a position where the front-blade driving member 18 is located as illustrated in FIG. 5A or where the cam lever 20 is located at a lock position in the counterclockwise direction in FIG. 5A via the slide pin 18b. A second position is a position where the front-blade driving member 18 is located as illustrated in FIG. 5B or where the cam lever 20 is located at an engaged position in the clockwise direction in FIG. 5A via the slide pin 18b.

The toggle spring 21 (spring member) forces the cam lever 20 in the counterclockwise direction in FIG. 5A where the cam lever 20 is located at the first position, and in the clockwise direction in FIG. 5A where the cam lever 20 is located at the second position. The force by the toggle spring 21 gradually decreases as the cam lever 20 rotates from the first position to the second position or the second position to the first position. Where the cam lever 20 is at an intermediate position illustrated in FIG. 5C or in a transition state between the first position and the second position, there is no force of the cam lever 20 in the rotating direction. As the cam lever 20 further rotates from the state illustrated in FIG. 5C, the force direction by the toggle spring 21 becomes reversed.

The front blade unit includes the front-blade main arm 4, the front blade sub arm 5, and the four blades 6, 7, 8, and 9. The shafts 1g and 1h are rotatably engaged with the holes 4a and 5a in the two blade arms 4 and 5 on the shutter base plate 1 on the side of the image sensor 403. The four blades 6, 7, 8, and 9 are sequentially pivotally supported via the coupling shaft 10 towards the other ends of the blade arms 4 and 5. The blade arm 4 has the hole 4b, with which the front-blade driving pin 18b in the front-blade driving member 18 is engaged. Thereby, as the front-blade driving member 18 rotates, the blades 6, 7, 8, and 9 can move between the close state for covering the aperture 1a in the shutter base plate 1 and the open state for retreating from the aperture 1a.

The shaft 1c on the shutter base plate 1 is engaged with a hole 19a in a rear-blade driving member 19. The rear-blade driving pin 19b is engaged with a hole 11b in the rear-blade main arm 11. A cam engagement pin 19c is engaged with a cam groove 23a in the cam gear 23 (first cam member).

The rear blade unit includes the rear-blade main arm 11, the rear-blade sub arm 12, and the four blades 13, 14, 15, and 16. Shafts 1i and 1j are rotatably engaged with holes 11a and 12a in the two blade arms 11 and 12 on the shutter base plate 1 on the side of the image sensor 403. The four blades 13, 14, 15, and 16 are sequentially pivotally supported via the coupling shaft 10 toward the other ends of the blade arms 11 and 12. The blade arm 11 has a hole 11b, with which the rear-blade driving pin 19b in the rear-blade driving member 19 is engaged. Thereby, as the rear-blade driving member 19 rotates, the blades 13, 14, 15, and 16 can move between the close state for covering the aperture 1a in the shutter base plate 1 and the open state for retreating from the aperture 1a.

A looseness preventive spring 17 has an inner diameter part guided by the shaft 1j on the shutter base plate 1 and is engaged with the shaft 1j on the shutter base plate 1 and a hole 12b in the rear-blade sub arm 12. Thereby, the rear-blade sub arm 12 is forced in a counterclockwise direction viewed from the object side (in which the blade opens the aperture 1a), and the looseness is prevented when the blades run. The looseness preventive spring 17 forces the rear-blade sub arm 12 in a direction in which the blades open the aperture 1a. Hence, the rear-blade driving pin 19b always contacts the hole 11b in the rear-blade main arm 11 via the blades 13 to 16 and the coupling shaft 10 on the contact side (on a cam surface closer to the rotating center of the cam gear 23) when the blades 13 to 16 close the aperture 1a. Therefore, where the blades 13, 14, 15, and 16 run so as to close the aperture 1a, there is no looseness between the rear-blade driving in 19b and the hole 11b in the rear-blade main arm 11 and the running start time is less likely to scatter.

The looseness preventive spring 17 forces the cam gear 23 side so that the cam engagement pin 19c in the rear-blade driving member 19 can always contact the cam surface on the cam groove 23a in the cam gear 23. Hence, in linkage with the rotation of the cam gear 23, the cam engagement pin 19c can slide while always following the cam surface on the cam groove 23a in the cam gear 23.

The internal diameter part of the drive spring 24 is guided by a root of the shaft 1d on the shaft base plate 1, and an arm 24a on the fixed end side is engaged with a lock part 1k on the shutter base plate 1 and an arm 24b on the movable end side is engaged with a spring lock member 28. Hence, the arm 24a is charged so as to generate a force in the counterclockwise direction in FIG. 1A and the arm 24b is charged so as to generate a force in the clockwise direction in FIG. 1A.

Figure 6A:
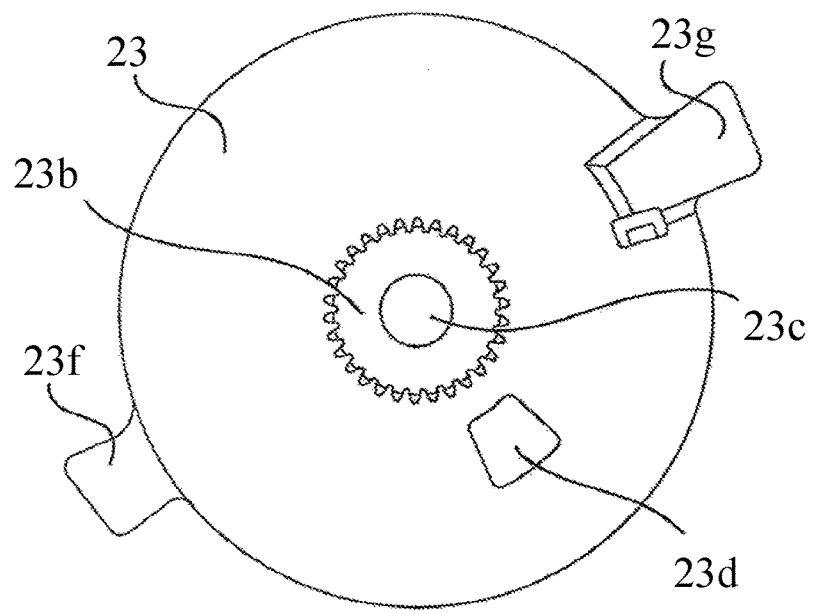
FIGS. 6A and 6B are a front view and a rear view of a cam gear in the focal plane shutter according to this embodiment.
Figure 6B:
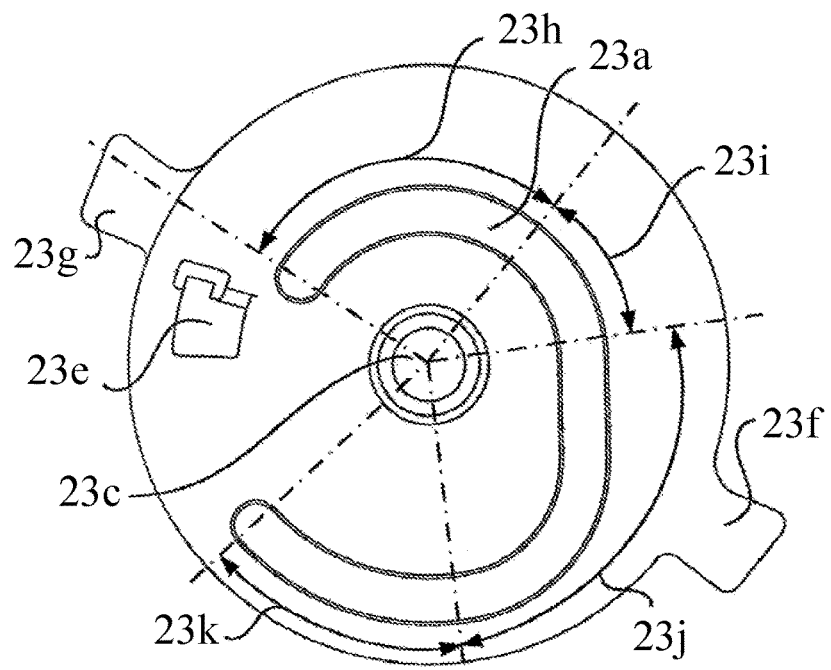

FIGS. 6A and 6B are front and rear views of the cam gear (first cam member) 23, respectively. The shaft 1d on the shutter base plate 1 is rotatably engaged with a hole 23c in the cam gear 23, and the cam gear 23 includes a drive-spring engagement part 23e engageable with the arm 24a on the movable end side of the drive spring 24. The cam groove 23a is formed concentric to the hole 23c and includes a first idle-running driving area 23h and a second idle-running driving area 23i for holding the blade unit in a standby state before running via the cam engagement pin 19c. The cam groove 23a further includes an exposure driving area 23j for folding and unfolding the blade unit between the open state and the close state of the aperture 1a, and a third idle-running driving area 23k, formed concentric to the hole 23c, for holding the blade unit in the running completion state.

Where the cam engagement pin 19c is located in the first idle-running driving area 23h, the arm 24b on the movable end side of the drive spring 24 is held by the spring holder 23e in the cam gear 23, and the drive spring 24 forces the cam gear 23 in the clockwise direction in FIG. 6A. The cam gear 23 includes a lock part 23d that contacts two cam engagement members 29 attached to the cover member 22 and is restricted from rotating in each of the clockwise and counterclockwise rotating directions.

The cam gear 23 includes a first convex 23f, and a second convex 23g having a height different from that of the first convex 23f in the optical axis direction. The first convex 23f is as tall as the first contact part 20b in the cam lever 20, and the second convex 23g is as tall as a second contact part 20c in the cam lever 20. Hence, as the cam gear 23 rotates, the first convex 23f in the cam gear 23 can contact the first contact part 20b in the cam lever 20, and the second convex 23g in the cam gear 23 can contact the second contact part 20c in the cam lever 20.

The motor 27 is attached to a motor plate 25. The motor plate 25 is screwed onto the cover member 22. A pinion gear 26 is attached to an output shaft 27a of the motor 27, perforates through a hole 22a in the cover member 22, is engaged with a gear unit 23b in the cam gear 23, and transmits the torque from the motor 27 to the cam gear 23. The motor 27 is a stepping motor that can provide step driving (open-loop driving or first mode) by changes a coil electrifying state for each predetermined time interval and two types of feedback driving (second mode) with different fast angle values.

The open-loop driving is used while the cam engagement pin 19c in the rear-blade driving member 19 is engaged with the first idle-running driving area 23h and the second idle-running driving area 23i in the cam groove 23a in the cam member 23. When the cam engagement pin 19c in the rear-blade driving member 19 moves from the second idle-running driving area 23i to the exposure driving area 23j in the cam groove 23a, the step driving (open-loop driving) is changed to the feedback driving (sensor driving). The sensor driving is a driving method that switches the coil electrifying state in accordance with an output of an unillustrated position sensor that outputs information on a drive position of the rear blade member 19. The motor 27 can drive the cam gear 23 in a clockwise direction in FIG. 1A or a first rotating direction, and in a counterclockwise direction in FIG. 1A or a second rotating direction.

Referring now to FIGS. 7 to 16B, a description will be given of an operation of the focal plane shutter 113. FIG. 7 is a timing chart illustrating an operation of each component in the focal plane shutter 113. FIGS. 8A to 16B are explanatory views of states of the focal plane shutter 113 at respective timings A to R illustrated in FIG. 7. In FIGS. 8A to 16B, the rotating direction, i.e., the clockwise direction or counterclockwise direction, is defined as a direction in the front view (viewed from image sensor 403 side).

(Imaging Standby State: Timing A)

Figure 8A:
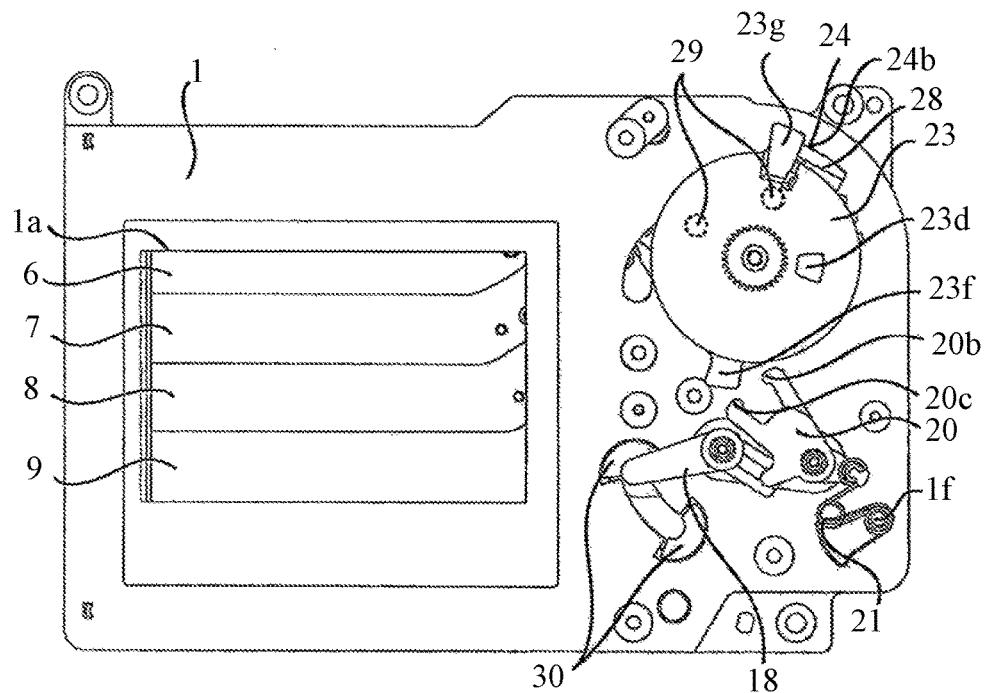
FIG. 8A is a (front) view of an imaging standby state (timing A) of the focal lane shutter according to this embodiment.
Figure 8B:
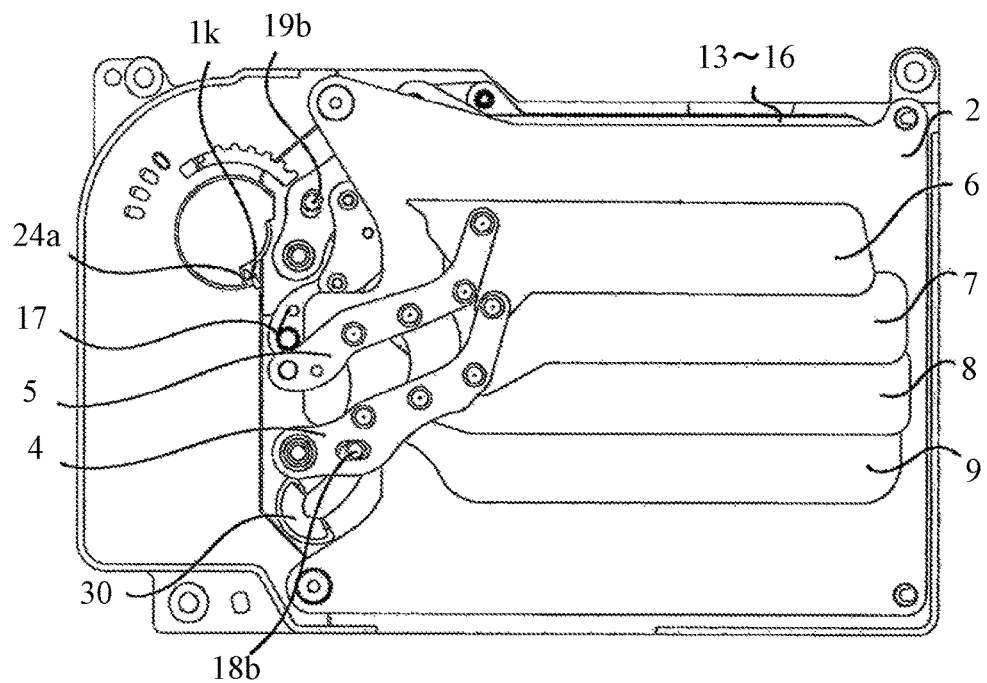
FIG. 8B is a (rear) view of the imaging standby state (timing A) of the focal lane shutter according to this embodiment.
Figure 8C:
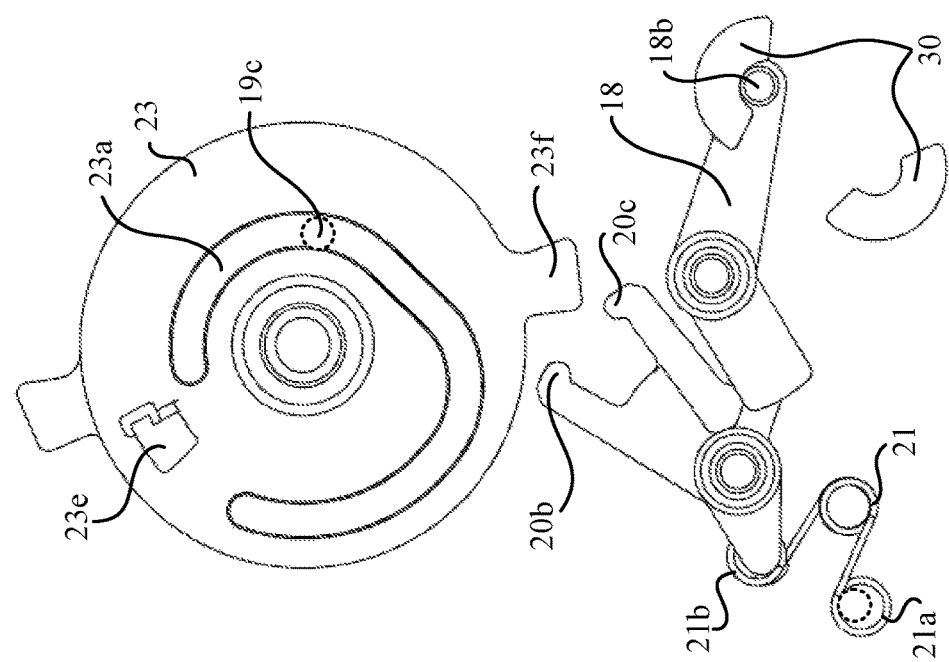
FIG. 8C is a (principal-part front) view of the imaging standby state (timing A) of the focal lane shutter according to this embodiment.
Figure 8D:
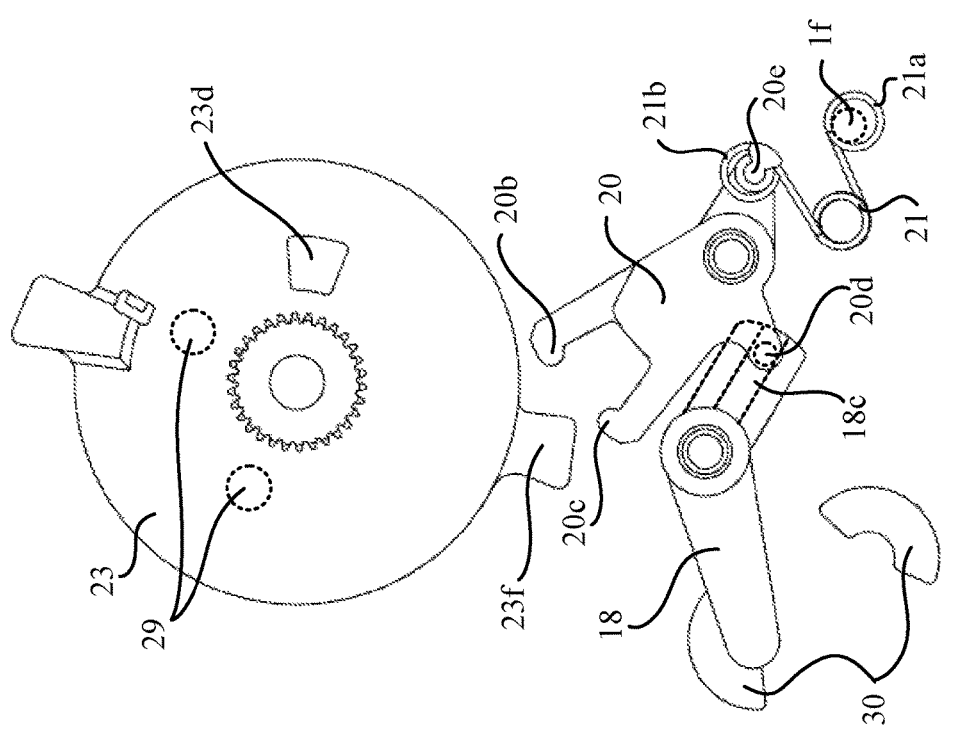
FIG. 8D is a (principal-part rear) view of the imaging standby state (timing A) of the focal lane shutter according to this embodiment.
Figure 9A:
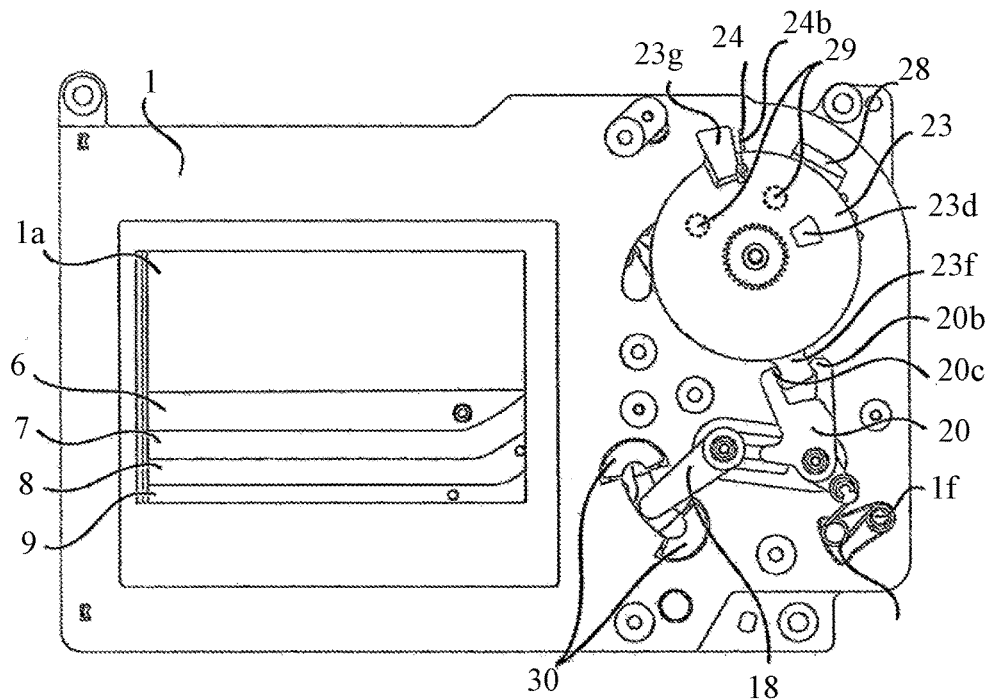
FIG. 9A is a (front) view of a charge state (timings B to D) in the focal plane shutter according to this embodiment.
Figure 9B:
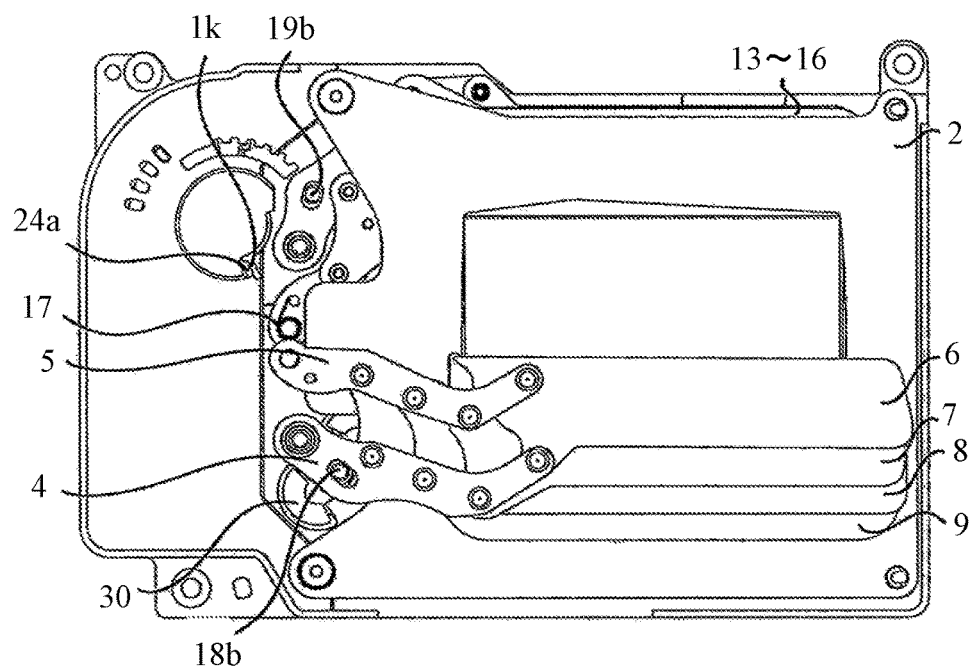
FIG. 9B is a (rear) view of the charge state (timings B to D) in the focal plane shutter according to this embodiment.
Figures 9C, 9D:
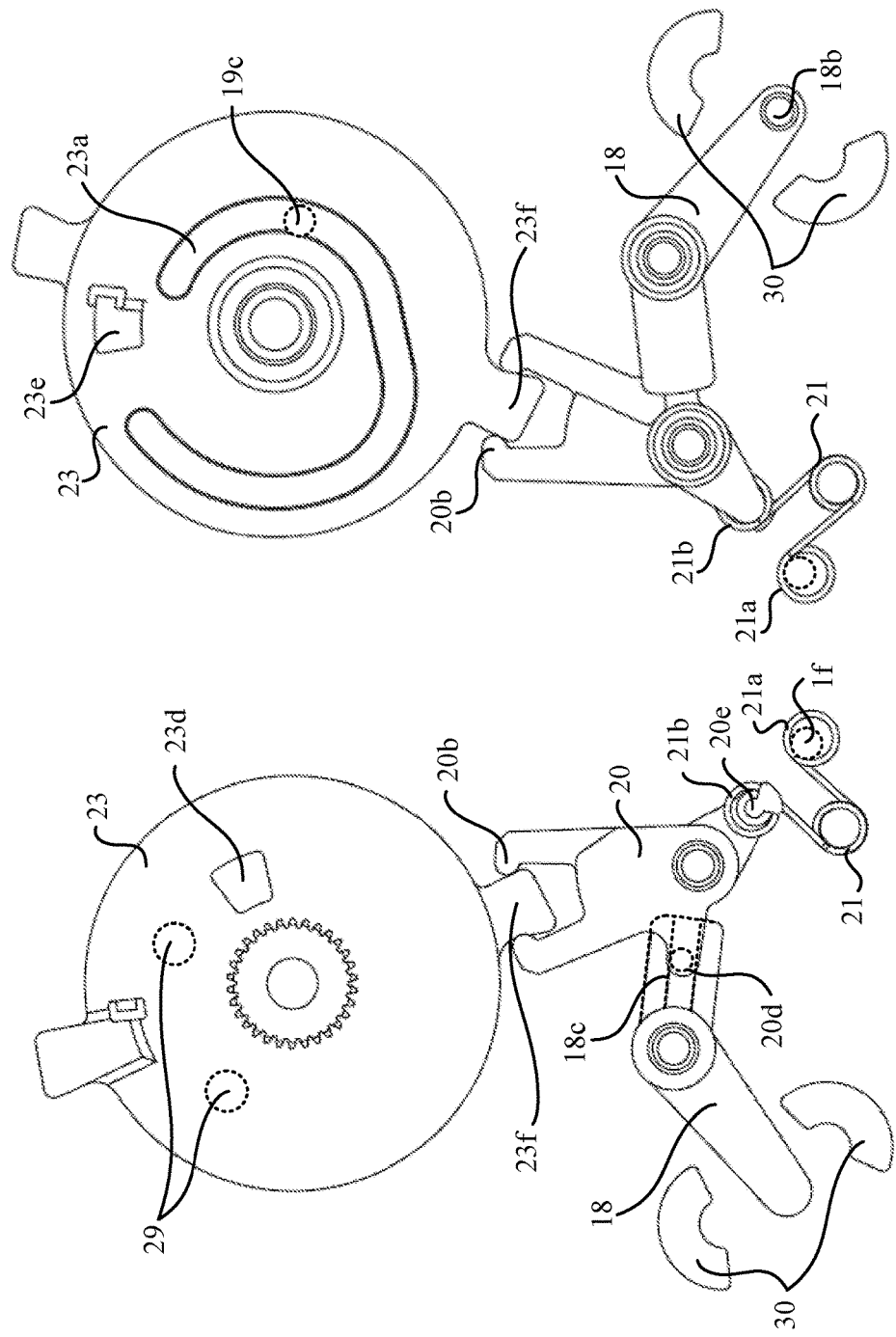
FIG. 9C is a (principal-part front) view of the charge state (timings B to D) in the focal plane shutter according to this embodiment.
FIG. 9D is a (principal-part rear) view of the charge state (timings B to D) in the focal plane shutter according to this embodiment.
Figure 10A:
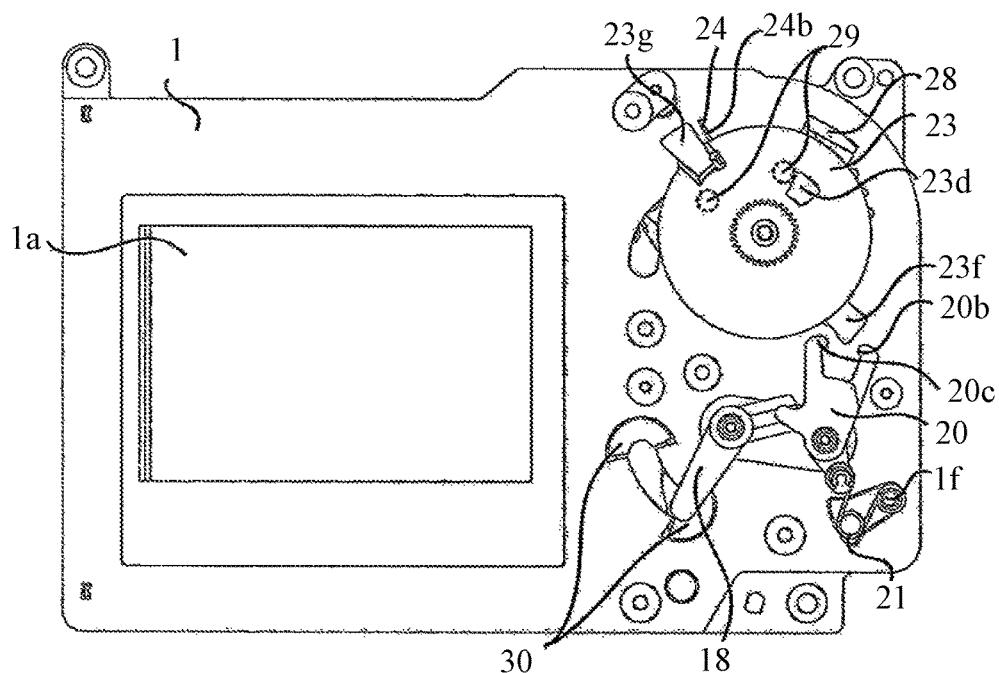
FIG. 10A is a (front) view of a charge completion state (timing E) of the focal plane shutter according to this embodiment.
Figure 10B:
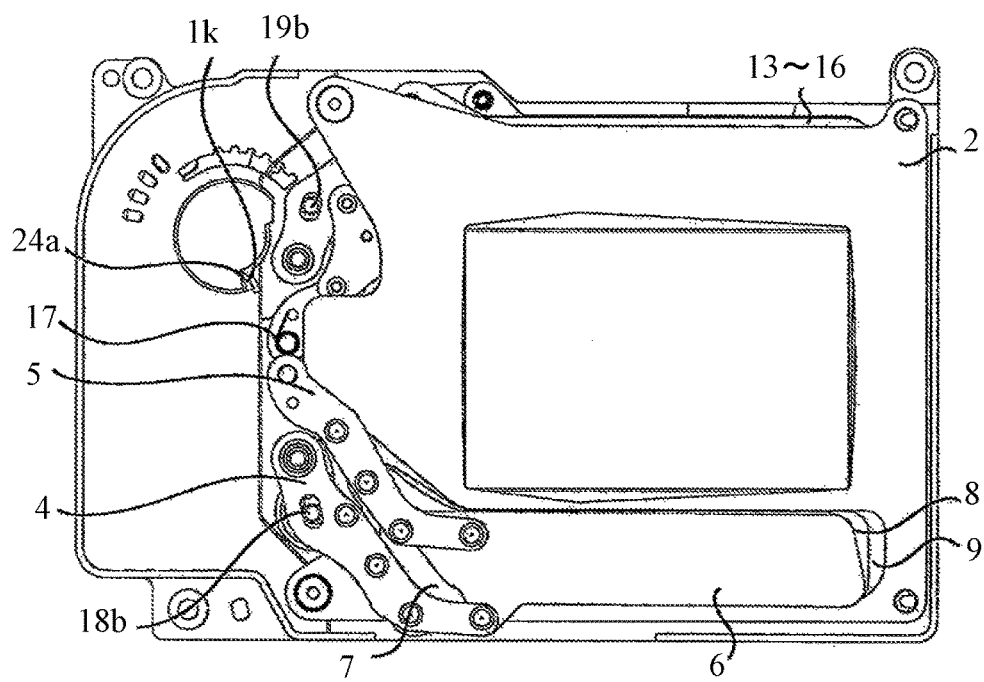
FIG. 10B is a (rear) view of the charge completion state (timing E) in the focal plane shutter according to this embodiment.
Figure 10D:
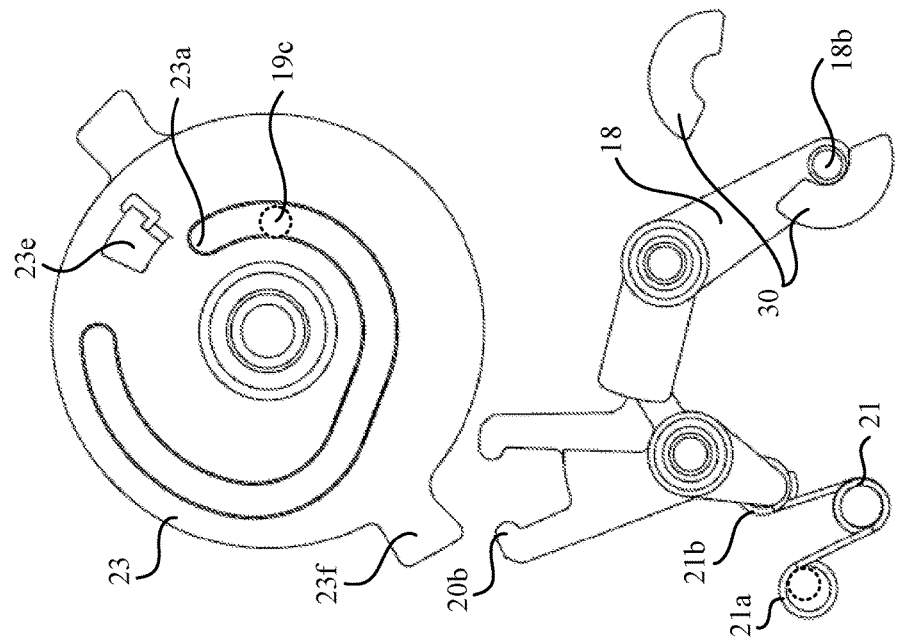
FIG. 10D is a (principal-part rear) view of the charge completion state (timing E) in the focal plane shutter according to this embodiment.
Figure 10C:
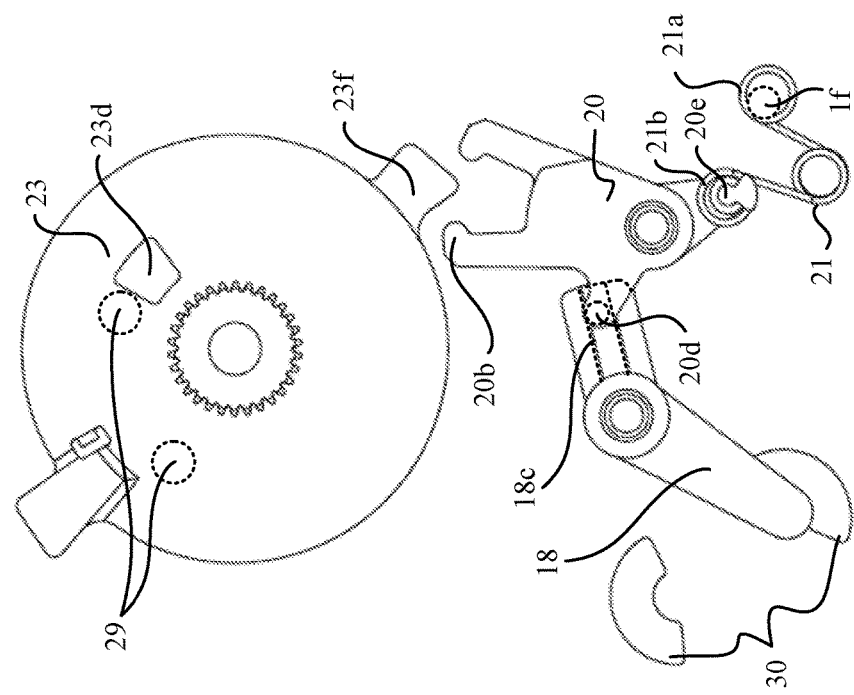
FIG. 10C is a (principal-part front) view of the charge completion state (timing E) in the focal plane shutter according to this embodiment.

FIGS. 8A to 8D illustrate a standby state (imaging standby state) of the focal plane shutter 113 before an image is captured. FIGS. 8A and 8B are a front view (viewed from the image sensor side) and a rear view (viewed from the object side) of the focal plane shutter 113, respectively. FIGS. 8C and 8D are a front view and a rear view of the principal part of the focal plane shutter 113 (which includes the front-blade driving member 18, the cam lever 20, the toggle spring 21, and the cam gear 23), respectively. This is applied to FIGS. 9A to 9D, FIGS. 10A to 10D, FIGS. 13A to 13D, FIGS. 14A to 14D, and FIGS. 15A to 15D.

At a timing A as the imaging standby state, the rear blades 13, 14, 15, and 16 open the aperture 1a, as illustrated in FIG. 8B. At this time, the looseness preventive spring 17 engaged with the hole 12b in the rear-blade sub arm 12 forces the rear-blade driving pin 19b in the rear-blade driving member 19 in the clockwise direction. The cam engagement pin 19c stands by in contact with the cam groove 23a in the cam gear 23 on a contact side on which the cam engagement pin 19c contacts the cam groove 23a when the blades 13, 14, 15, and 16 close the aperture 1a (or on a cam surface closer to the rotating center of the cam gear 23). At this time, the drive-spring engagement portion 23e of the cam gear 23 is sufficiently distant from the arm 24b in the drive spring 24 engaged with the spring lock member 28. Hence, the drive spring 24 does not apply the force to the cam gear 23.

The cam lever 20 is forced in the counterclockwise direction by the toggle spring 21, and held at the first position. The front-blade driving member 18 is forced in the counterclockwise direction via the rail part 18c by the slide pin 20d in the cam lever 20. Hence, the blades 6, 7, 8, and 9 close the aperture 1a.

(Charge State: Timings B, C, D, and E)

When the switch (SW1) 498 turns on at the timing A, the motor 27 is driven in the second rotating direction in the feedback driving mode with a low (or moderate) fast (or advance) angle. Hence, the cam gear 23 rotates in the counterclockwise direction from the state illustrated in FIG. 8A. Since the pinion gear 26 in the motor 27 is engaged with the gear unit 23b in the cam gear 23, the rotating direction of the motor 27 and the rotating direction of the cam gear 23 are opposite to each other.

As the cam gear 23 starts rotating, the arm 24b in the drive spring 24 is held by the drive-spring engagement portion 23e in the cam gear 23 and separated from the spring lock member 28. Hence, the cam gear 23 is forced in the clock direction by the drive spring 24. Since the cam gear 23 rotates in the counterclockwise direction while charging the drive spring 24, the load fluctuation of the motor 27 increases. However, the motor 27 is driven in the feedback driving mode with the low fast angle, the motor 27 does not step out.

As the cam gear 23 rotates in the counterclockwise direction from the state (timing A) illustrated in FIGS. 8A to 8D, the first convex 23f in the cam gear 23 contacts the first contact part 20b in the cam lever 20 (timing B). As the cam gear 23 further rotates in the counterclockwise direction from the timing B, the first contact part 20b in the cam lever 20 is pressed against the first convex 23f in the cam gear 23 and rotated in the clockwise direction, as illustrated in FIGS. 9A to 9D. FIGS. 9A to 9D illustrate a charge state of the focal plane shutter 113. As the cam lever 20 rotates, the slide pin 20d in the cam lever 20 rotates the front-blade driving member 18 in the counterclockwise direction while sliding on the rail part 18c in the front-blade driving member 18. Thereby, the blades 6, 7, 8, and 9 that shield the light from the aperture 1a start moving in the opening direction of the aperture 1a.

As the cam gear 23 rotates to a timing C, the force by the toggle spring 21 applied to the cam gear 20 is switched in a direction in which the cam lever 20 is rotated in the clockwise direction. As the cam gear 23 further rotates in the counterclockwise direction from the timing C, the cam lever 20 receives the force from the toggle spring 21 in addition to the force from the first convex 23*f* in the cam gear 23 and rotates in the clockwise direction. Hence, since the cam lever 20 rotates in the clockwise direction with an assistance of the force of the toggle spring 21, the load to the motor 27 can be relaxed when the cam gear 23 is charged.

A control circuit 312 rotates the lock part 23*d* in the cam gear 23 and the cam engagement member 29 by a predetermined number of steps after they contact each other, and controls the drive circuit 313. Hence, the lock part 23*d* in the cam gear 23 contacts the cam engagement member 29 and the rotation of the cam gear 23 stops.

The cam lever 20 reaches the second position. The front-blade driving member 18 that is rotated by the force of the toggle spring 21 via the cam lever 20 stops rotating when the front-blade driving pin 18*b* collides with the buffer member 30. At this time, the blades 6, 7, 8, and 9 open the aperture 1*a*, as illustrated in FIGS. 10A to 10D (timing E). FIGS. 10A to 10D illustrate a charge completion state (timing E) of the focal plane shutter 113. When the switch (SW1) 498 turns on at the timing A, the imaging apparatus 400 (CPU 409) instructs an unillustrated distance-measuring unit to measure a distance to the object and the lens controller 491 to move the imaging lens 401 for an imaging preparation operation, such as focusing.

(Step Driving: First Idle-Running Driving Period: Timings F to G)

As the switch (SW2) 499 turns on, the CPU 409 controls the TG 408 and resets all pixels on the image sensor 403. More specifically, the CPU 409 turns the signals res_1 to res_n into the low level and the signals tx_1 to tx_n into the high level, and resets the PD 441 in all pixel units 420 from the first row to n-th row. When the switch (SW2) 499 turns on, the unillustrated mirror driver retreats the mirror unit 481 from the imaging optical path, the unillustrated object luminance measuring unit measures the object luminance, and the lens controller 491 drives the unillustrated diaphragm in the imaging lens 401.

At a timing F a predetermined time period after the switch (SW2) 499 turns on, the motor 27 is electrified in the first rotating direction opposite to the rotating direction in the charging time, so that the blades 13, 14, 15, and 16 close the aperture 1*a* and the cam gear 23 is rotated. Thereby, the approach run starts in the step driving mode. In the approach run, the control circuit 312 gradually reduces the predetermined driving pulse and gradually increases the rotating speed of the motor 27.

As the electrification to the motor 27 starts, the cam gear 23 is rotated in the clockwise direction by the force of the drive pin 24, and starts approach run. The cam engagement pin 19*c* in the rear blade drive member 19 starts accelerating due to the force of the looseness preventive spring 17 engaged with the hole 11*b* in the rear-blade main arm 11. At this time, the cam engagement pin 19*c* starts accelerating in contact with the first idle-running driving area 23*h* in the cam groove 23*a* in the cam gear 23 on the contact side on which the cam engagement pin 19*c* contacts the cam groove 23*a* when the blades 6, 7, 8, and 9 close the aperture 1*a* (or on the cam surface closer to the rotating center of the cam gear 23).

(Step Driving/Second Idle-Running Driving Period: Timings G to H)

As the motor 27 is further rotated in the first rotating direction, the arm 24*b* in the drive spring 24 is locked by the spring lock member 28 (timing G) and the cam gear 23 does not receive the force from the drive spring 24. Hence, the cam gear 23 is rotated only by the driving force of the motor 27. The cam engagement pin 19*c* in the rear-blade driving member 19 further accelerates due to the force of the looseness preventive spring 17 engaged with the hole 12*b* in the rear-blade sub arm 12. At this time, the cam engagement pin 19*c* accelerates in contact with the second idle-running driving area 23*i* in the cam groove 23*a* in the cam gear 23 on the contact side on which the cam engagement pin 19*c* contacts the cam groove 23*a* when the blades 6, 7, 8, and 9 closes the aperture 1*a* (or on the cam surface closer to the rotating center of the cam gear 23). In a period from when the switch (SW2) 499 turns on to when the TG 408 starts the electronic front curtain operation under the control of the CPU 409, the overall pixel reset state continues on the image sensor 403.

A predetermined time period after the switch (SW2) 499 turns on, the TG 408 starts the electronic front curtain scanning prior to the blade running. The electronic front curtain running starts accumulating the electric charges for each line on the image sensor 403 in which all pixels are reset. More specifically, the vertical scanning circuit 421 turns the signal tx_* into the low level in order from the n-th line to the first line. Thereby, the PD 441 in each line sequentially releases the reset state and enters the accumulation state.

Figure 11A:
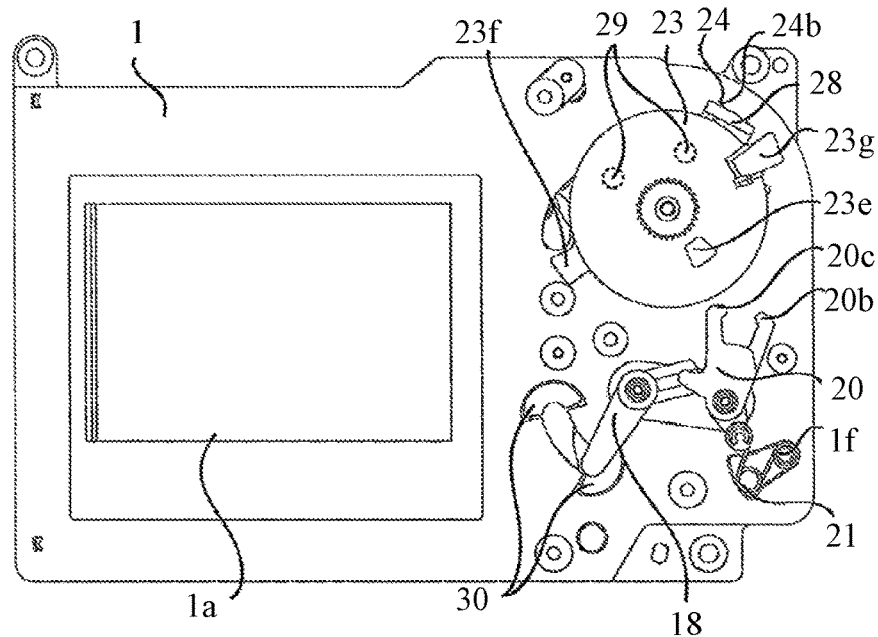
FIGS. 11A and 11B illustrate a step driving state (timing H) of the focal plane shutter according to this embodiment.
Figure 11B:
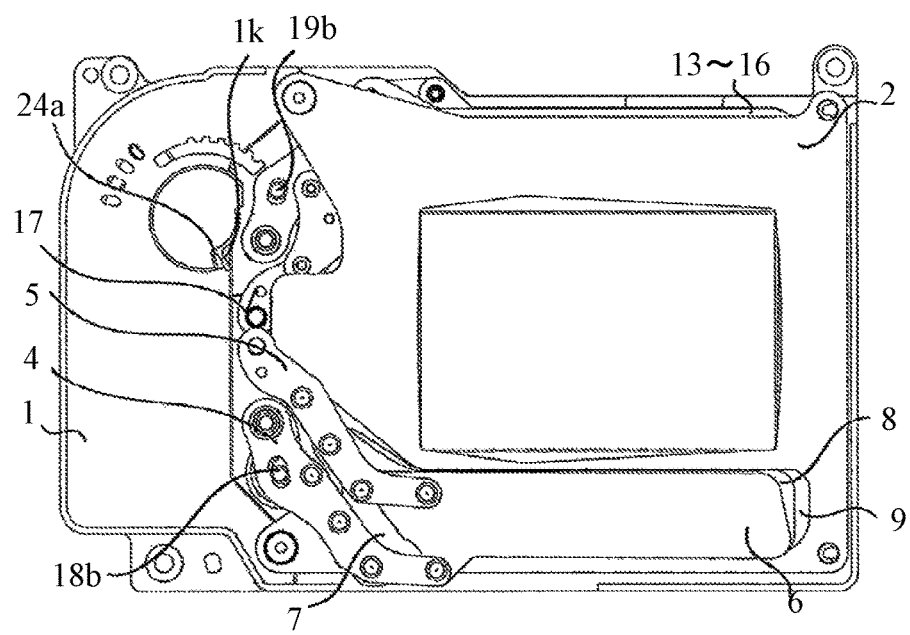

The scanning pattern for starting the electric charge accumulation for each line fits the running characteristics of the blades 13, 14, 15, and 16. Hence, any lines on the image sensor 403 have a uniform accumulation time period (exposure time period). In the approach run driving, the cam engagement pin 19*c* traces the first idle-running driving area 23*h* and the second idle-running driving area 23*i* on the cam gear 23 in which the cam lift is approximately zero. Therefore, the position of the rear-blade driving member 19 in the state (timing H) illustrated in FIGS. 11A and 11B is the same as that of the rear-blade driving member 19 illustrated in FIGS. 8A to 10D. FIGS. 11A and 11B illustrate the step driving state (timing H) of the focal plane shutter 113. Thereby, the even when the motor 27 is driven in the step driving mode, the load does not fluctuate or the motor does not step out.

In this idle-running driving period (steps F to H), the first convex 23*f* in the cam gear 23 again approaches to the cam lever 20, but is sufficiently distant from and does not contact the first contact part 20*b* in the cam lever 20. Since the position of the first convex 23*f* in the cam gear 23 is different from that of the second contact part 20*c* in the cam lever 20 in the optical axis direction, the first convex 23*f* does not contact the second contact part 20*c* and can rotate. Therefore, the blades 6, 7, 8, and 9 can maintain the opening state of the aperture 1*a*.

(Rear-Blade Driving Start (Step Driving to High Fast Angle Driving): Timings H to I)

The control circuit 312 controls the drive circuit 313 so as to drive the cam gear 23 in the clockwise direction in the feedback driving mode with a high fast angle a predetermined step after the step F (timing H). As the cam gear 23 rotates in the clockwise direction from the timing G, the cam engagement pin 19*c* in the rear-blade driving member 19 moves from the second idle-running driving area 23*i* to the exposure driving area 23*j* in this period (timing H). Then, it traces the exposure driving area 23*j* and rotates the rear-blade driving member 19. Thereby, the blades 13, 14, 15, and 16 that open the aperture 1*a* closes the aperture 1*a* and shield the light from the image sensor 403.

Hence, it is necessary to drive the motor 27 at a high speed in the exposure driving, and the load fluctuation becomes larger in driving the motor 27. At this time, the motor 27 is driven in the feedback driving mode with the high fast angle and thus the motor 27 does not step out due to the high-speed driving or load fluctuation. Since the motor 27 has a sufficiently high rotating speed after the approach run driving, the motor 27 can be driven at a high speed in the feedback driving mode with the high fast angle. When the blade running starts, the influence of a change of the rotary drive force of the motor 27 is relatively small on the rotating speed of the cam gear 23 and the synchronization with the electric signal. Hence, the motor 27 can stably drive the blades without stepping out even with slight load fluctuations.

The exposure time period corresponds to a time period from the electronic front curtain scanning to the light shielding of the image sensor 403 by the blades 13, 14, 15, and 16. The exposure time period is controlled by controlling the predetermined time period of the motor electrifying start after the switch (SW2) 499 turns on at the timing F. This embodiment starts electronic front curtain scanning after the motor 27 is electrified at the timing F, but the motor 27 may be electrified after the electronic front curtain scanning starts depending on the exposure time period (such as when the exposure time period is long).

(Deceleration: Timing I)

Figure 12A:
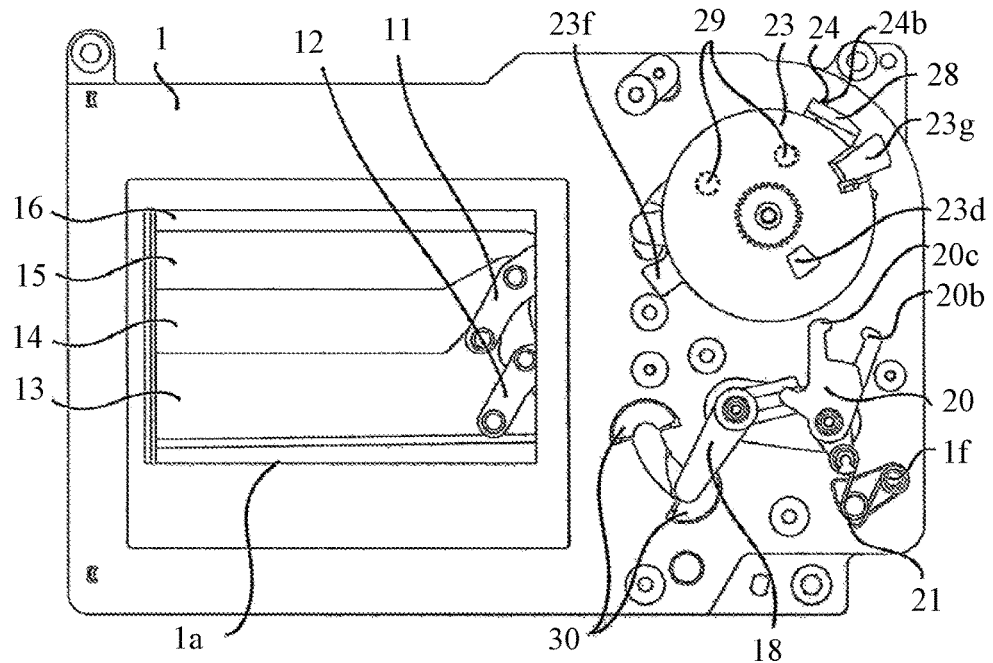
FIGS. 12A and 12B illustrate a deceleration start state (timing I) in the focal plane shutter according to this embodiment.
Figure 12B:
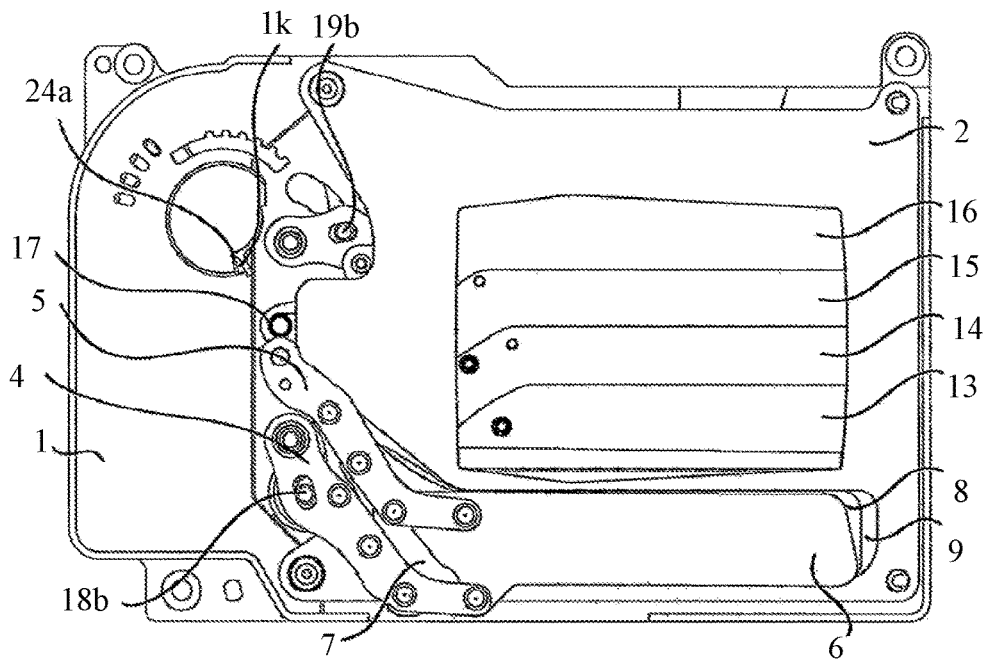
Figure 13A:
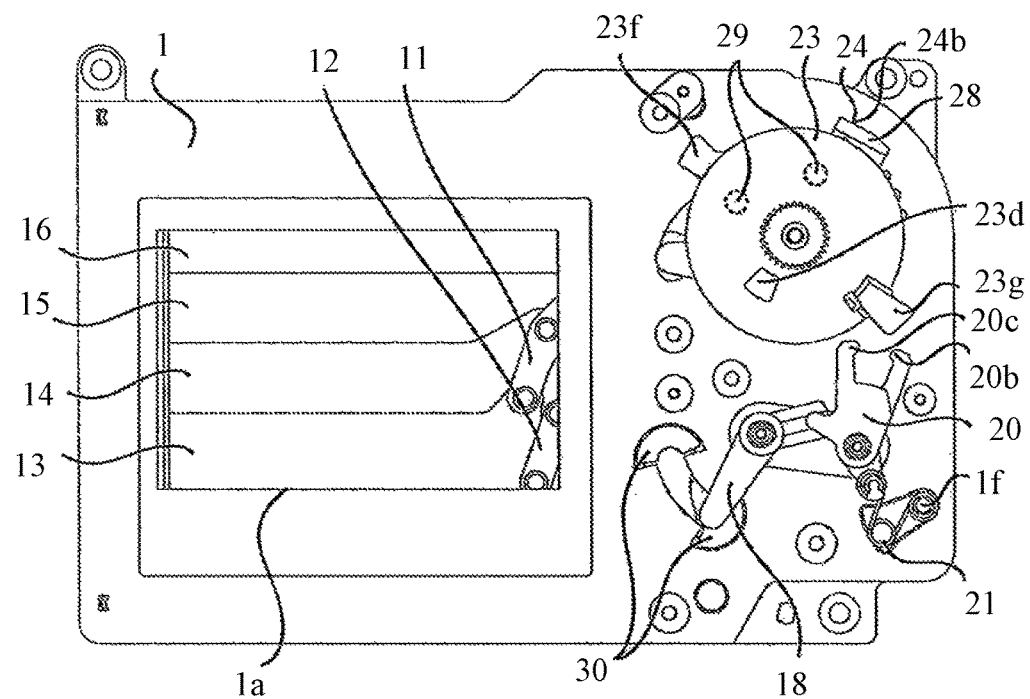
FIG. 13A is a (front) view of a rear-blade running completion state (timing J) in the focal plane shutter according to this embodiment.
Figure 13B:
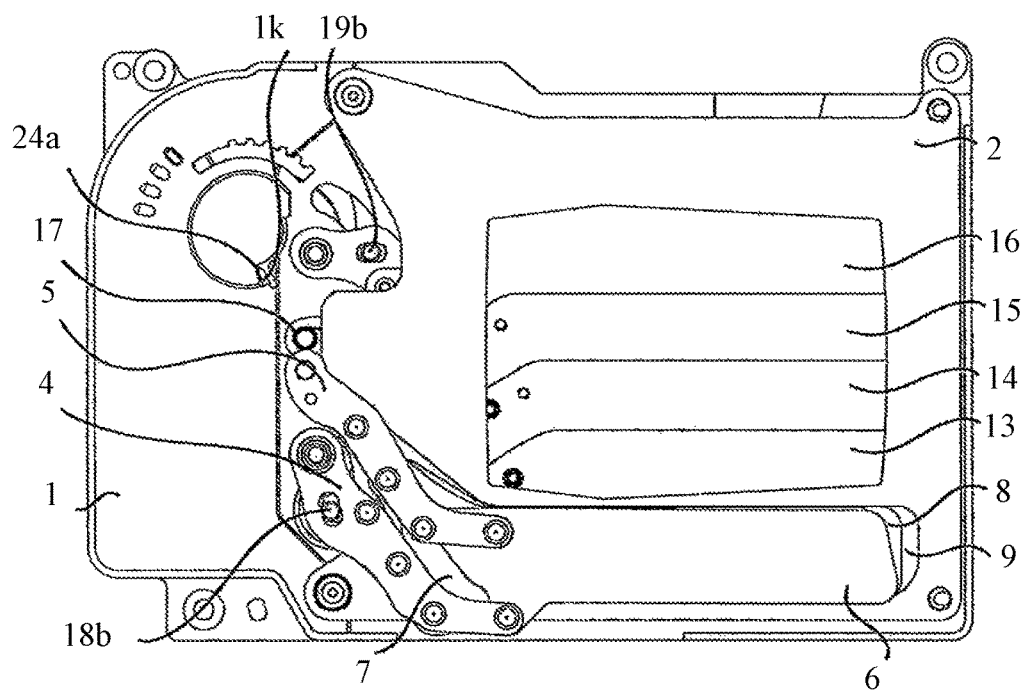
FIG. 13B is a (rear) view of the rear-blade running completion state (timing J) in the focal plane shutter according to this embodiment.
Figure 13D:
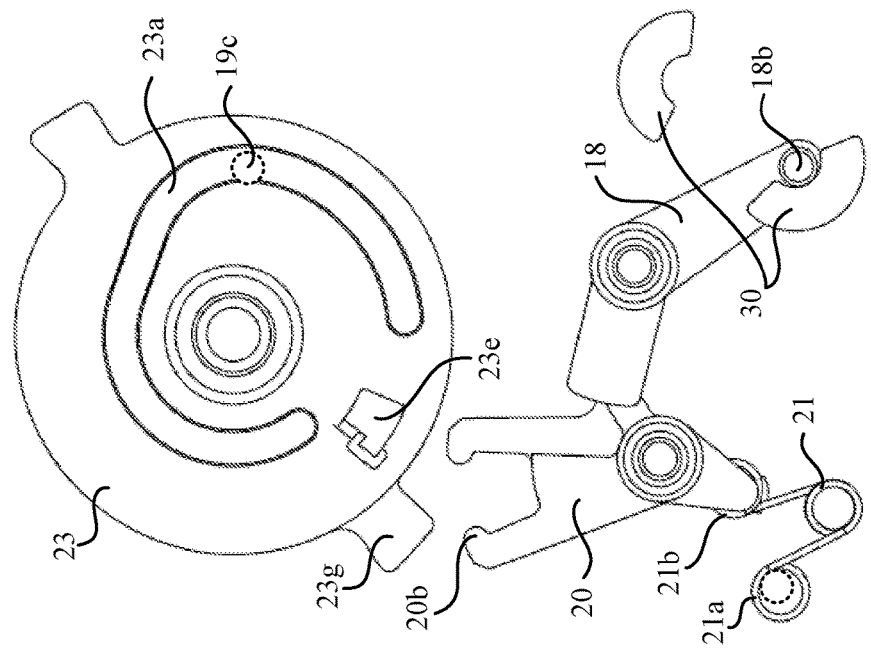
FIG. 13D is a (principal-part rear) view of the rear-blade running completion state (timing J) in the focal plane shutter according to this embodiment.
Figure 13C:
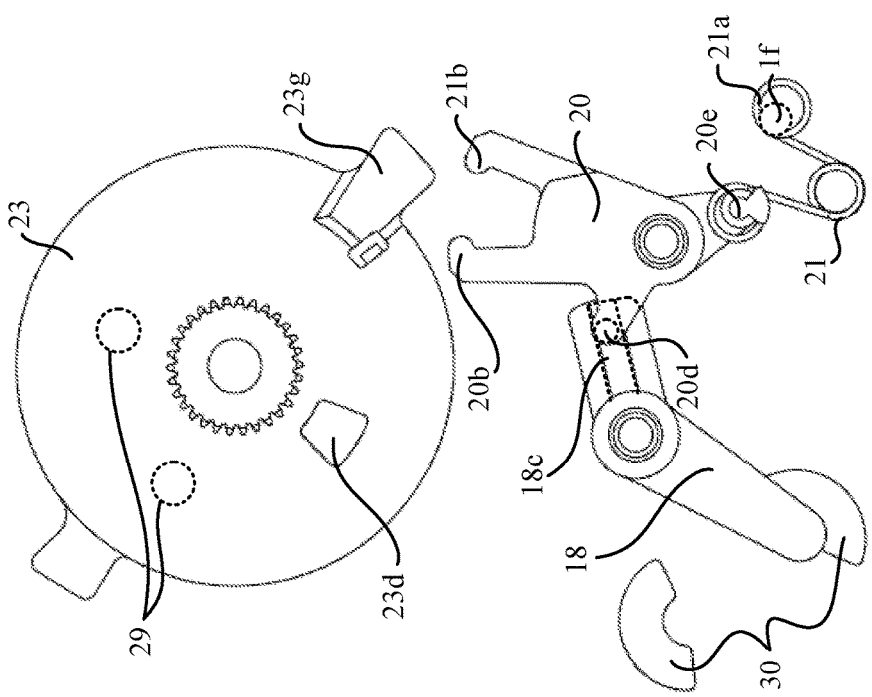
FIG. 13C is a (principal-part front) view of the rear-blade running completion state (timing J) in the focal plane shutter according to this embodiment.
Figure 14A:
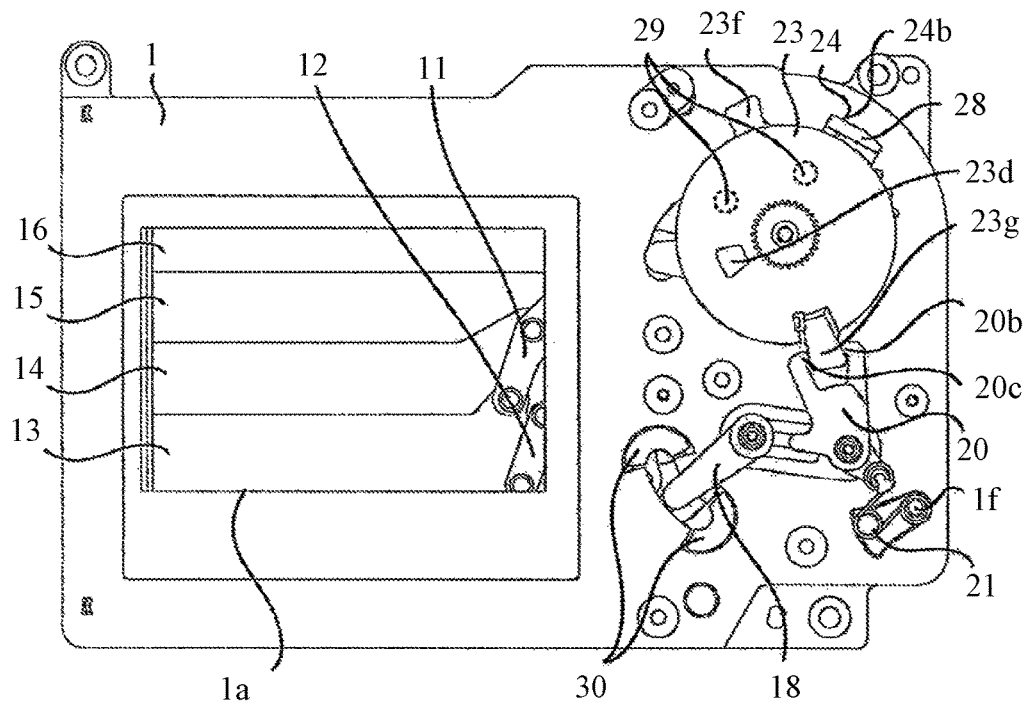
FIG. 14A is a (front) view of a front-blade charging state (timing K) in the focal plane shutter according to this embodiment.
Figure 14B:
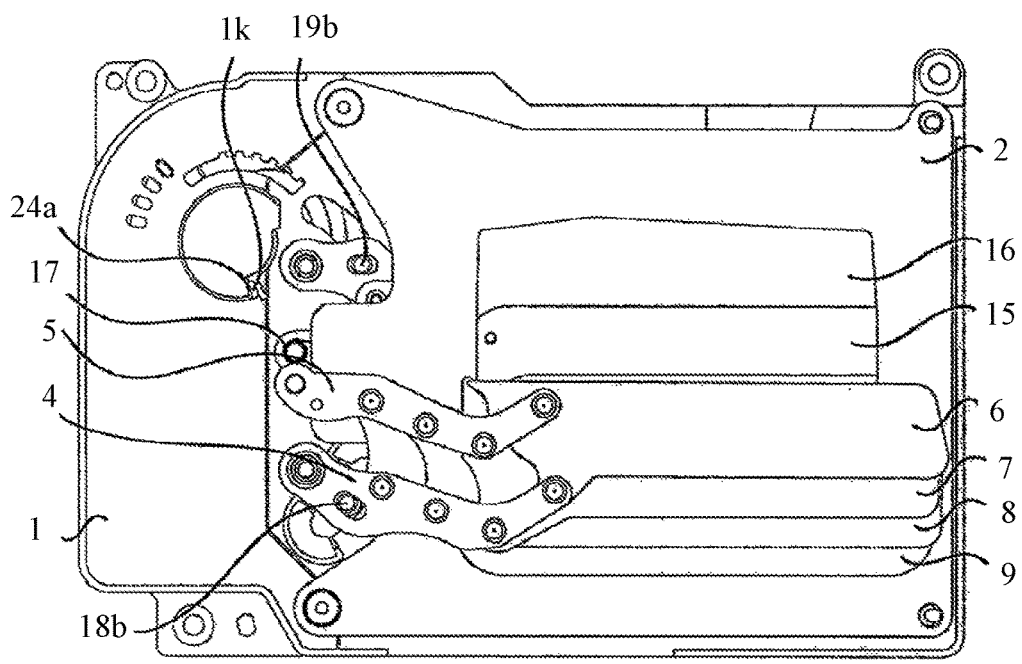
FIG. 14B is a (rear) view of the front-blade charging state (timing K) in the focal plane shutter according to this embodiment.
Figures 14C, 14D:
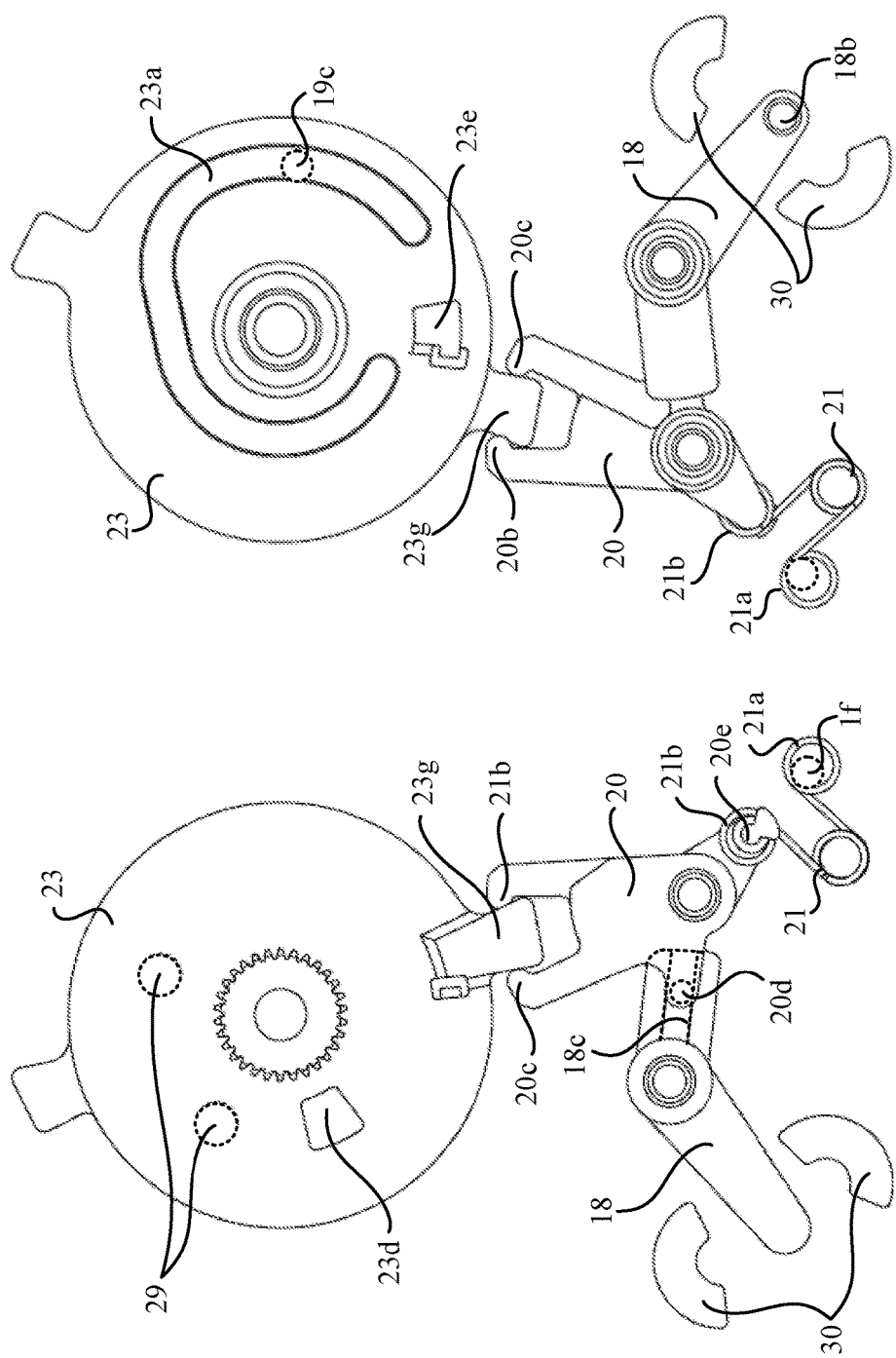
FIG. 14C is a (principal-part front) view of the front-blade running state (timing K) in the focal plane shutter according to this embodiment.
FIG. 14D is a (principal-part rear) view of the front-blade charging state (timing K) in the focal plane shutter according to this embodiment.
Figure 15A:
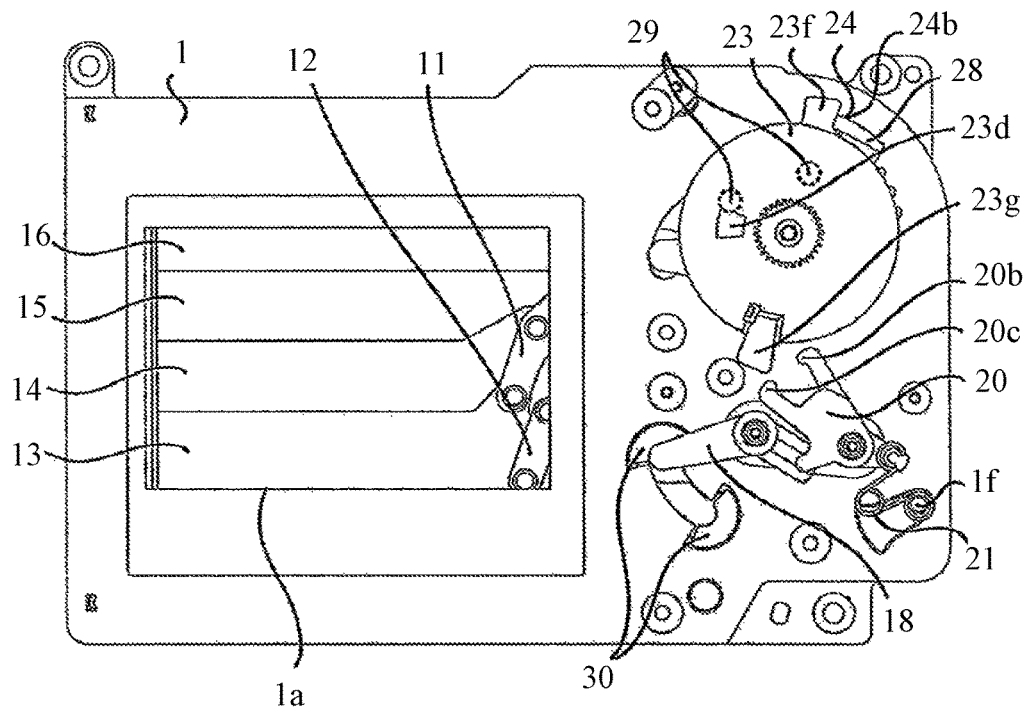
FIG. 15A is a (front) view of a cam-gear stop running state (timing N) in the focal plane shutter according to this embodiment.
Figure 15B:
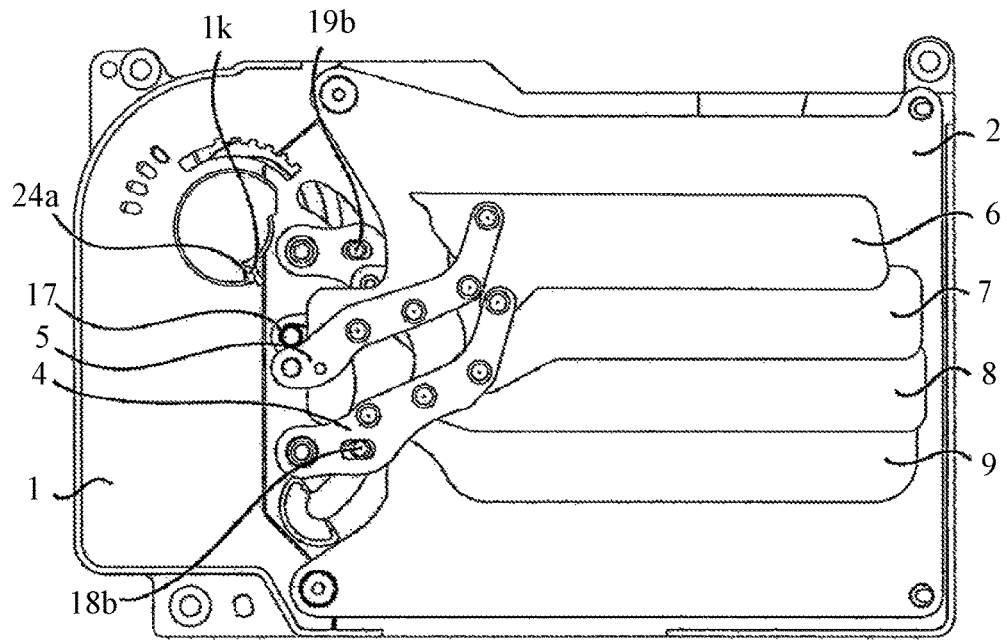
FIG. 15B is a (rear) view of the cam-gear stop state (timing N) in the focal plane shutter according to this embodiment.
Figures 15C, 15D:
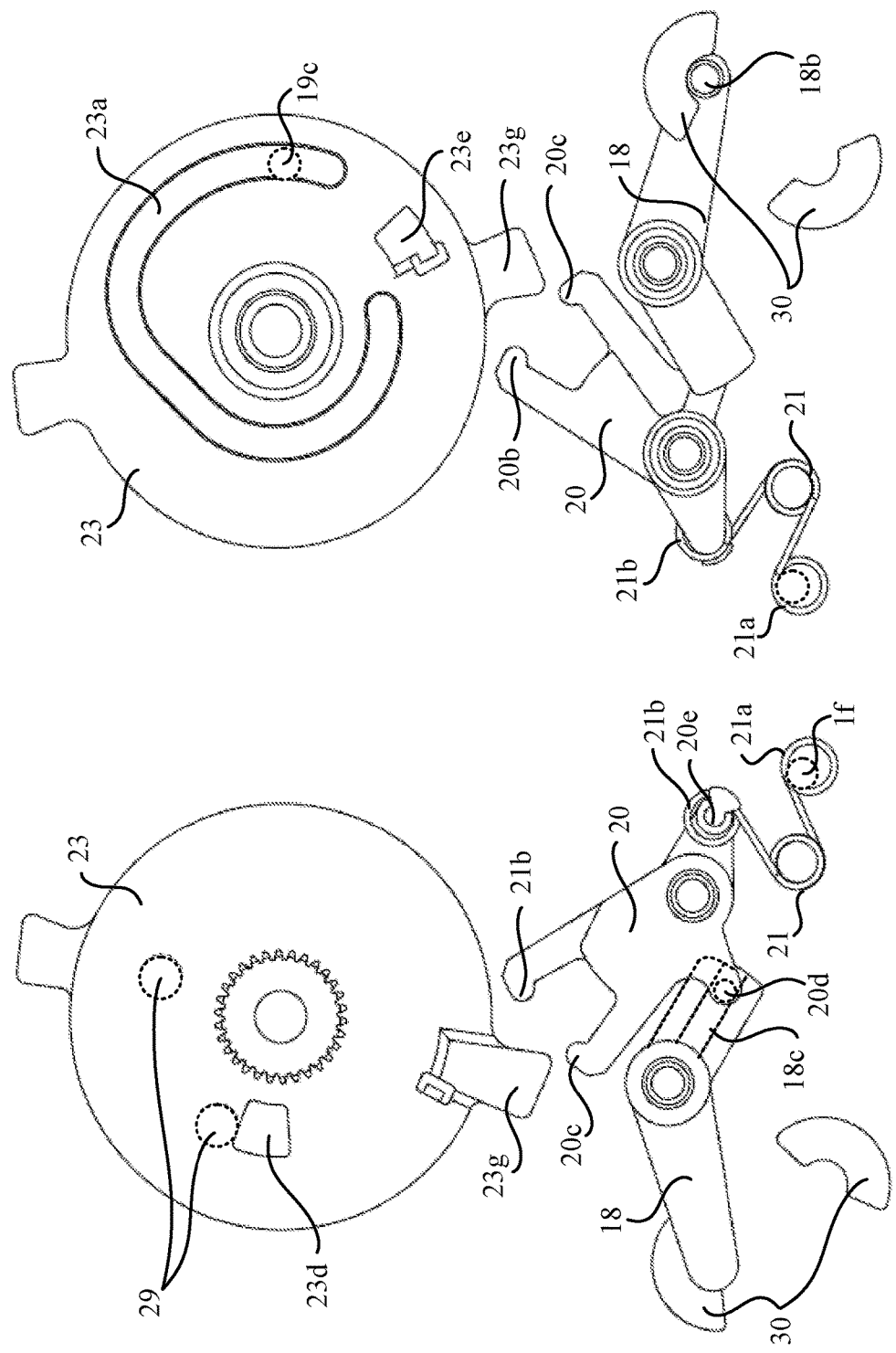
FIG. 15C is a (principal-part front) view of the cam-gear stop state (timing N) in the focal plane shutter according to this embodiment.
FIG. 15D is a (principal-part rear) view of the cam-gear stop state (timing N) in the focal plane shutter according to this embodiment.

When the driving with the high fast angle of the motor 27 continues from the state illustrated in FIGS. 11A and 11B (timing H), the state becomes as illustrated in FIGS. 12A and 12B (timing I). FIGS. 12A and 12B illustrate a deceleration start state (timing I) of the focal plane shutter 113.

The cam engagement pin 19c in the rear-blade driving member 19 reaches the area in which the rear-blade driving member 19 decelerates just before moving to the third driving area 23k on the cam gear 23. Since the cam engagement pin 19c in the rear-blade driving member 19 receives a force from the cam surface on the cam groove 23a in the cam gear 23, the force transmits to the interlocking rear blade unit. Since the blades 13, 14, 15, and 16 receive the force opposite to the inertia, the blades 13, 14, 15, and 16 deform in the optical axis direction. The most highly projecting coupling shaft 10 in the optical axis direction in the blade unit is more likely to contact the shutter base plate 1 and the partition plate 2 due to the decelerations of the blades 13, 14, 15, and 16. However, the coupling shaft 10 just before the third driving area 23k provided with the deceleration area is sufficiently distant from the front end of the aperture 1a. Hence, the coupling shaft 10 does not contact the aperture 1a or the vibration of the blade attenuates enough to cause little dust even when the coupling shaft 10 contacts the aperture 1a.

The control circuit 312 continues the high fast angle driving from the deceleration area, and turns the sensor high fast angle driving into the step driving when the unillustrated magnetic sensor configured to detect the motor 27 inputs a predetermined pulse number (timing I). The control circuit 312 controls the drive circuit 313 so as to change the rotating speed of the motor 27 into the low speed.

(Rear Blade Running Completion: Timing I)

When the step driving of the motor 27 continues from the timing I, the cam engagement pin 19c in the rear-blade driving member 19 reaches the third driving area 23k in the cam groove 23a as illustrated in FIGS. 13A to 13D (rear-blade running completion state: timing J). FIGS. 13A to 13D illustrate the rear blade running completion state of the focal plane shutter 113. The cam gear 23 is still rotating at this time, but the cam engagement pin 19c in the rear-blade driving member 19 is concentrically located in the third driving area 23k in the cam gear 23, and the blade unfolding force is not applied.

(Third Running Period (Front Blade Charge): Timings K, L, and M)

As the cam gear 23 further rotates in the clockwise direction from the state (timing J) illustrated in FIGS. 13A to 13D, the second convex 23g in the cam gear 23 contacts the second contact part 20c in the cam lever 20 (timing K). FIGS. 14A to 14D illustrate the front-blade charge state (timing K) of the focal plane shutter 113. The cam lever 20 rotates in the counterclockwise direction as the cam gear 23 rotates in the clockwise direction (as a result of that the second contact part 20c is pressed against the second convex 23g). At this time, since part of the rotational energy of the cam gear 23 is used to rotate the cam lever 20, the cam lever 20 can be efficiently decelerated. As the cam lever 20 rotates, the slide pin 20d in the cam lever 20 slides along the rail part 18c in the drive member 18 and rotates the front-blade driving member 18 in the counterclockwise direction. Thereby, the blades 6, 7, 8, and 9 that open the aperture 1a starts moving in the closing direction of the aperture 1a.

As the cam gear 23 rotates to the timing L, the force by the toggle spring 21 received by the cam lever 20 is changed from the clockwise direction to the counterclockwise direction. As the cam gear 23 further rotates in the clockwise direction from the timing L, the cam lever 20 receives the force of the toggle spring 21 in addition to the force from the second convex 23g in the cam gear 23 and rotates in the counterclockwise direction. The front-blade driving member 18 that is rotated by the force of the toggle spring 21 via the cam lever 20 stops rotating when the front-blade driving pin 18b collides with the buffer member 30. At this time, the blades 6, 7, 8, and 9 close the aperture 1a (timing M).

(Cam Gear Stop: Timing N)

The control circuit 312 rotates the lock part 23d in the cam gear 23 and the cam engagement member 29 by a predetermined number of steps after they contact each other, and controls the drive circuit 313 so as to hold the electrification of the motor 27. Hence, as illustrated in FIGS. 15A to 15D, the engagement unit 23d in the cam gear 23 contacts the cam engagement member 29 and the rotation of the cam gear 23 stops (timing N). FIGS. 15A to 15D illustrate the cam-gear stop state of the focal plane shutter 113 (timing N).

At the timing N, the blades 6, 7, 8, and 9 shield the light from the image sensor 403. Thus, the imaging apparatus 400 (CPU 409) starts still-image read scanning of the image sensor 403, and the unillustrated mirror driver moves the mirror unit 481 into the imaging optical path so as to set the viewfinder observation state.

(Standby Position Restoration: Timings O and P)

When the still-image read scanning from the image sensor 403 ends a predetermined time period after the timing N, the restoration to the standby position starts (timing O). In other words, the motor 27 is rotated in the second rotating direction by the step driving, and the cam gear 23 starts rotating in the counterclockwise direction in FIG. 15A. The cam engagement pin 19c in the rear-blade driving member 19 is located in the third concentric driving area 23k, and the rotation of the cam gear 23 does not transmit to the rear-blade driving member 19.

In the standby-position restoration action, the second convex 23g in the cam gear 23 again approaches to the cam lever 20, but is sufficiently distant from the second contact part 20c in the cam lever 20 and does not contact the second contact part 20c. The second convex 23g in the cam gear 23 is different from the first contact part 20b in the cam lever 20 in position in the optical axis direction, and can rotate without contacting it. Thus, the blades 6, 7, 8, and 9 can maintain the closing state of the aperture 1a.

When the motor 27 continues the step driving by a predetermined number of steps after the electrification starts, the cam engagement pin 19c in the rear-blade driving member 19 reaches the exposure driving area 23j in the cam gear 23. Thus, the rear-blade driving member 19 starts rotating in the clockwise direction around the shaft 1c as a center on the shutter base plate 1 (timing P). At the same time, the aperture 1a is closed, and the blades 13, 14, 15, and 16 that shield the light from the imagen sensor 403 starts opening the aperture 1a.

(Deceleration in Restoration Action: Timings Q and R)

Figure 16A:
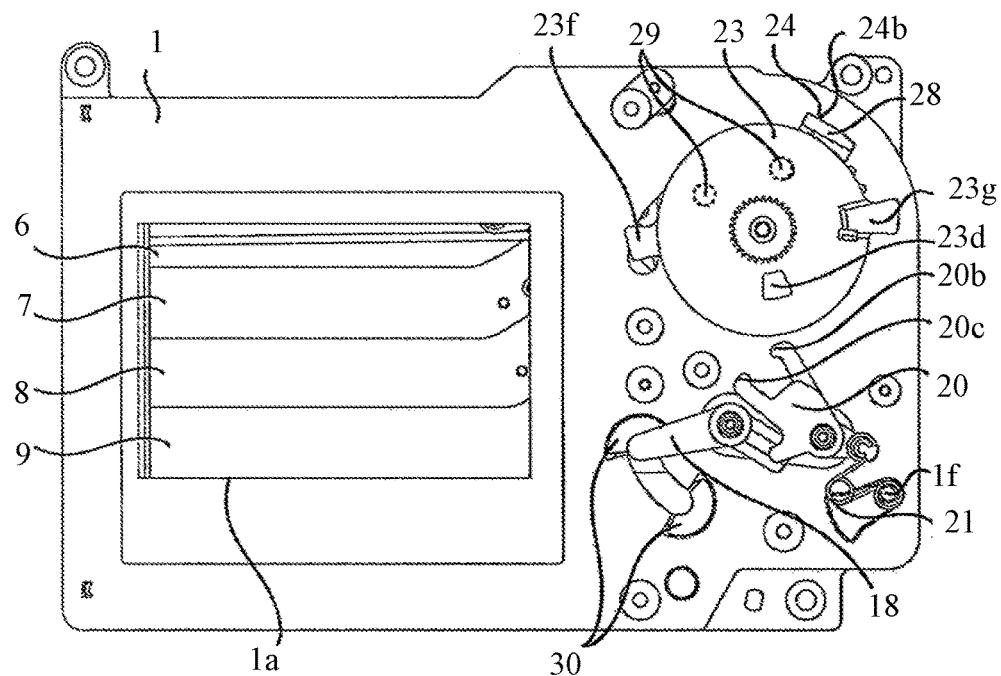
FIGS. 16A and 16B are a front view and a rear view of a rear-blade deceleration start state (timing Q) in the focal plane shutter according to this embodiment.
Figure 16B:
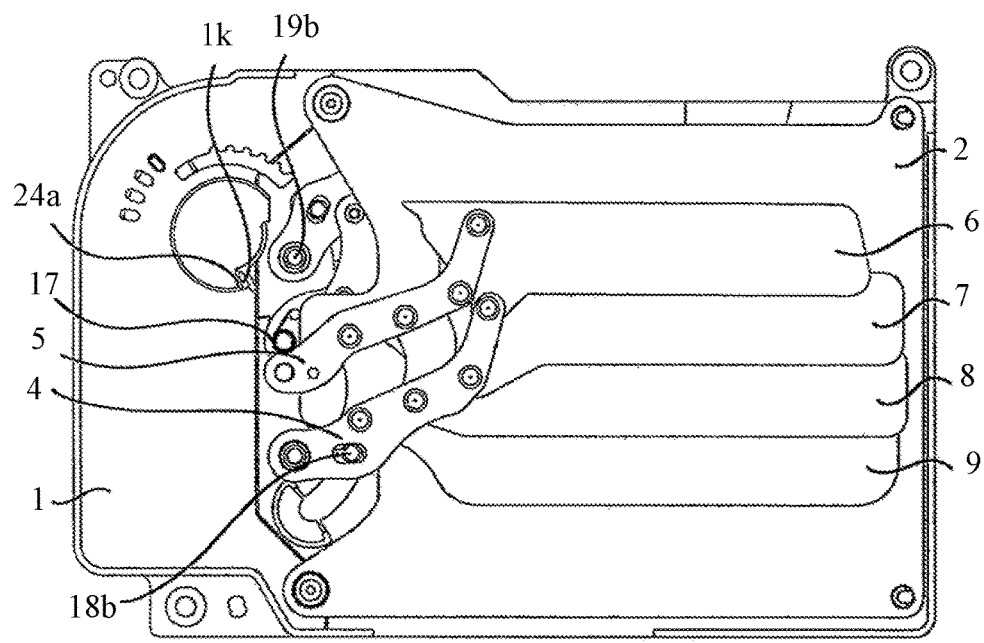

The control circuit 312 changes the motor 27 from the sensor high fast angle driving to the step driving at a timing Q at which the unillustrated magnetic sensor for the motor 27 detects the predetermined number of pulses after the timing O, and controls the drive circuit 313 so as to decelerate the step driving speed. FIGS. 16A and 16B illustrate the rear-blade deceleration start state (timing Q) of the focal plane shutter 113 (where FIG. 16A is a front view and FIG. 16B is a rear view).

Next to the deceleration of the motor 27, the cam engagement pin 19c in the rear-blade driving member 19 reaches the second driving area 23i. The rotating speed of the motor 27 is reduced in front of the second driving area 23i so as to reduce the speed at which the cam engagement pin 19c in the rear-blade driving member 19 collides with the second driving area 23i. Thereby, cutting caused by the collision between the cam engagement pin 19c and the cam groove 23a is less likely to occur. The second driving area 23i is an acceleration area in the blade running and affects the SH accuracy.

This embodiment reduces the speed of the motor 27 prior to cam switching so as to maintain the SH accuracy which would be lowered by the cutting of the second driving area 23i due to insufficient durability. Unlike the low-speed driving of all areas, partial low-speed driving does not delay the restoration time. As the motor 27 continues the step driving, the rotating speed of the rear-blade driving member 19 reduces because it follows the cam groove 23a. The cam engagement pin 19c in the rear-blade driving member 19 reaches the second concentrically-formed driving area 23i on the cam gear 23, and the blades 13, 14, 15, and 16 that operate together with the rear-blade driving member 19 reach the stop position (timing R). At this time, the motion energy of the blades 13, 14, 15, and 16 is not completely lost and thus the cam engagement pin 19c alternately collides with the inner surface and the outer surface on the second concentric driving area 23i and slight vibrations continue until the motion energy is lost.

As the motor step driving further continues with a predetermined step from the timing R, the electrification to the motor 27 stops at the stop position illustrated in FIGS. 8A to 8D (step S(A')).

A shutter apparatus according to this embodiment is a shutter apparatus of an electronic front curtain system, and includes the motor 27, a first light shield (rear blade unit), a second light shield (front blade unit), and a first cam member (cam gear 23). The motor 27 can rotate in a first rotating direction (such as a counterclockwise direction) and a second rotating direction (such as a clockwise direction) opposite to the first rotating direction. Each of the first light shield and the second light shield is movable between a close state for closing the aperture 1a and an open state for opening the aperture 1a. The first cam member interlocks and moves the first light shield and the second light shield in accordance with a rotation in each of the first rotating direction and the second rotating direction of the motor 27.

The first cam member may move the first light shield and the second light shield at different timings between the close state and the open state in accordance with the rotation in each of the first rotating direction and the second rotating direction of the motor. The first cam member may move the first light shield prior to the second light shield in accordance with the rotation in each of the first rotating direction and the second rotating direction of the motor.

The first cam member may move the second light shield from the open state to the close state (timings K to M) after moving the first light shield from the open state to the close state (timings H to I) by the rotation of the motor in the first rotation direction. The first cam member may move the second light shield from the close state to the open state (timings P to Q) after moving the first light shield from the close state to the open state (timings B to D) by the rotation of the motor in the second rotation direction.

The shutter apparatus may further include a second cam member (cam lever 20). The cam member can move between a first position for holding the second light shield in the close state and a second position for holding the second light shield in the open state. The shutter apparatus may include a spring member (toggle spring 21) configured to force the second cam member. The spring member may force the second cam member in a direction in which the second light shield moves from the open state to the close state, when the second cam member is located at the first position. The spring member may force the second cam member in a direction in which the second light shield moves from the close state to the open state, when the second cam member is located at the second position.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This embodiment can provide a shutter apparatus for an electronic front curtain system, an imaging apparatus, a control method for a shutter apparatus, and a storage medium for storing a control program, each of which is small and economic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-159529, filed Aug. 16, 2016, which is hereby incorporated by reference herein in its entirety.

What is claimed is:

1. A shutter apparatus which is able to operate on an electronic front curtain system, the shutter apparatus comprising:
   a motor configured to rotate in a first rotating direction and a second rotating direction opposite to the first rotating direction;
   a first light shield movable between a close state for closing an aperture and an open state for opening the aperture;
   a second light shield movable between the close state for closing the aperture and the open state for opening the aperture; and
   a first cam member configured to interlock and move the first light shield and the second light shield in accordance with a rotation in each of the first rotating direction and the second rotating direction of the motor,
   wherein the first cam member moves the second light shield from the open state to the close state after moving the first light shield from the open state to the close state by the rotation of the motor in the first rotating direction, and
   wherein the first cam member moves the second light shield from the close state to the open state after moving the first light shield from the close state to the open state by the rotation of the motor in the second rotating direction.

2. The shutter apparatus according to claim 1, wherein the first cam member moves the first light shield and the second light shield at different timings between the close state and the open state in accordance with the rotation in each of the first rotating direction and the second rotating direction of the motor.

3. The shutter apparatus according to claim 1, wherein the first cam member moves the first light shield prior to the second light shield in accordance with the rotation in each of the first rotating direction and the second rotating direction of the motor.

4. The shutter apparatus according to claim 1, further comprising a second cam member movable between a first position for holding the second light shield in the close state and a second position for holding the second light shield in the open state.

5. The shutter apparatus according to claim 4, further comprising a spring member configured to force the second cam member,
   wherein the spring member forces the second cam member in a direction in which the second light shield moves from the open state to the close state, when the second cam member is located at the first position, and
   wherein the spring member forces the second cam member in a direction in which the second light shield moves from the close state to the open state, when the second cam member is located at the second position.

6. The shutter apparatus according to claim 4, wherein the first cam member has a first convex and a second convex, wherein the second cam member includes a first contact part and a second contact part,
   wherein the second cam member moves from the first position to the second position as the first convex in the first cam member is pressed against the first contact part in the second cam member, and
   wherein the second cam member moves from the second position to the first position as the second convex in the first cam member is pressed against the second contact part in the second cam member.

7. An imaging apparatus comprising:
   an image sensor configured to photoelectrically convert an optical image formed by an imaging optical system, and
   a shutter apparatus which is able to operate on an electronic front curtain system, wherein the shutter apparatus includes:
   (1) a motor configured to rotate in a first rotating direction and a second rotating direction opposite to the first rotating direction;
   (2) a first light shield movable between a close state for closing an aperture and an open state for opening the aperture;
   (3) a second light shield movable between the close state for closing the aperture and the open state for opening the aperture; and
   (4) a first cam member configured to interlock and move the first light shield and the second light shield in accordance with a rotation in each of the first rotating direction and the second rotating direction of the motor,
   wherein the first cam member moves the second light shield from the open state to the close state after moving the first light shield from the open state to the close state by the rotation of the motor in the first rotating direction, and
   wherein the first cam member moves the second light shield from the close state to the open state after moving the first light shield from the close state to the open state by the rotation of the motor in the second rotating direction.

8. The imaging apparatus according to claim 7, further comprising a motor controller configured to control driving of the motor,
   wherein the motor controller drives the motor in a first mode by switching a coil electrifying state of the motor for each predetermined time interval when the second light shield moves from the open state to the close state, and feedback-drives the motor in a second mode based on information on a position of the first light shield when the first light shield moves from the open state to the close state.

9. A control method of a shutter apparatus which is able to operate on an electronic front curtain system, the control method comprising the steps of:
   moving a first light shield and a second light shield from an open state for opening an aperture to a close state for closing the aperture at different timings in accordance with a rotation of a motor in a first rotating direction; and
   moving the first light shield and the second light shield from the close state to the open state at different timings in accordance with a rotation of the motor in a second rotating direction opposite to the first rotating direction,
   wherein the first light shield and the second light shield are moved between the open state and the close state by a cam member configured to interlock and move the first shield member and the second light shield,
   wherein, in the step of moving the first light shield and the second light shield from the open state to the close state, the cam member moves the second light shield from the open state to the close state after moving the first light shield from the open state to the close state by the rotation of the motor in the first rotating direction, and wherein, in the step of moving the first light shield and the second light shield from the close state to the open state, the cam member moves the second light shield from the close state to the open state after moving the first light shield from the close state to the open state by the rotation of the motor in the second rotating direction.

10. A non-transitory computer-readable storage medium storing a control method of a shutter apparatus which is able to operate on an electronic front curtain system, wherein the control method includes the steps of:

moving a first light shield and a second light shield from an open state for opening an aperture to a close state for closing the aperture at different timings in accordance with a rotation of a motor in a first rotating direction; and moving the first light shield and the second light shield from the close state to the open state at different timings in accordance with a rotation of the motor in a second rotating direction opposite to the first rotating direction, wherein the first light shield and the second light shield are moved between the open state and the close state by a cam member configured to interlock and move the first shield member and the second light shield, wherein, in the step of moving the first light shield and the second light shield from the open state to the close state, the cam member moves the second light shield from the open state to the close state after moving the first light shield from the open state to the close state by the rotation of the motor in the first rotating direction, and wherein, in the step of moving the first light shield and the second light shield from the close state to the open state, the cam member moves the second light shield from the close state to the open state after moving the first light shield from the close state to the open state by the rotation of the motor in the second rotating direction.

* * * * *